(12) United States Patent
Dudar

(10) Patent No.: US 9,739,244 B2
(45) Date of Patent: Aug. 22, 2017

(54) METHOD FOR DETECTING AIR FILTER DEGRADATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 14/874,304

(22) Filed: Oct. 2, 2015

(65) Prior Publication Data

US 2017/0096974 A1    Apr. 6, 2017

(51) Int. Cl.
| | |
|---|---|
| *F02M 35/09* | (2006.01) |
| *B60K 15/035* | (2006.01) |
| *B60W 20/00* | (2016.01) |
| *F02M 25/08* | (2006.01) |
| *F02D 41/00* | (2006.01) |

(52) U.S. Cl.
CPC ....... *F02M 35/09* (2013.01); *B60K 15/03519* (2013.01); *B60W 20/00* (2013.01); *F02D 41/003* (2013.01); *F02M 25/0809* (2013.01)

(58) Field of Classification Search
CPC ...... F02M 35/09; B01D 46/446; G01M 15/09
See application file for complete search history.

(56) References Cited

U.S. PATENT DOCUMENTS

| | | | | |
|---|---|---|---|---|
| 3,320,792 | A | | 5/1967 | Peranio |
| 6,016,690 | A | * | 1/2000 | Cook ................... G01M 3/025 73/40.5 R |
| 7,444,234 | B2 | * | 10/2008 | Bauerle ................. F02M 35/09 123/361 |
| 8,327,695 | B2 | | 12/2012 | Jackson et al. |
| 8,573,040 | B2 | * | 11/2013 | Guzman ............. F02M 35/024 73/114.31 |
| 8,626,456 | B2 | | 1/2014 | Moore et al. |
| 8,701,473 | B2 | * | 4/2014 | Uehara ................. F02M 35/09 73/114.31 |
| 8,959,910 | B2 | | 2/2015 | Rollinger |

(Continued)

FOREIGN PATENT DOCUMENTS

| | | |
|---|---|---|
| DE | 3630430 C1 | 10/1987 |
| DE | 4315577 A1 | 12/1993 |
| DE | 102009018704 A1 | 10/2010 |

OTHER PUBLICATIONS

Dudar, Aed M. et al., "Method for Detecting Leaks in an Intake Manifold," U.S. Appl. No. 14/709,048, filed May 11, 2015, 59 pages.

(Continued)

*Primary Examiner* — Freddie Kirkland, III
(74) *Attorney, Agent, or Firm* — James Dottavio; McCoy Russell LLP

(57) ABSTRACT

Methods and systems are provided for determining a status of an air filter in an intake of an engine in a hybrid vehicle. One example method includes, during an engine-off condition, utilizing a pump in an evaporative leak check module of the hybrid vehicle to produce a pressure in an intake manifold of the engine, and indicating degradation of the air filter based on a comparison of barometric pressure and the pressure produced in the intake manifold. In this way, degradation of the air filter may be determined without engine operation.

20 Claims, 9 Drawing Sheets

(56) References Cited

U.S. PATENT DOCUMENTS

| | | | |
|---|---|---|---|
| 9,399,970 B2* | 7/2016 | Peters | F02M 25/0818 |
| 9,599,071 B2* | 3/2017 | Dudar | F02M 25/0827 |
| 2008/0255749 A1* | 10/2008 | Murakami | F02D 17/02 |
| | | | 701/103 |
| 2009/0187301 A1* | 7/2009 | Wang | F02D 41/18 |
| | | | 701/31.4 |
| 2011/0100106 A1* | 5/2011 | Spargo | G01M 15/02 |
| | | | 73/114.37 |
| 2014/0076249 A1 | 3/2014 | Rollinger et al. | |
| 2015/0090006 A1* | 4/2015 | Peters | F02M 25/0818 |
| | | | 73/40.5 R |
| 2016/0332620 A1* | 11/2016 | Dudar | B60W 20/50 |

OTHER PUBLICATIONS

Dudar, Aed M., "Systems and Methods for Canister Filter Diagnostics," U.S. Appl. No. 14/729,825, filed Jun. 3, 2015, 45 pages.

* cited by examiner

METHOD FOR DETECTING AIR FILTER DEGRADATION

FIELD

The present description relates generally to methods and systems for diagnosing an air filter coupled in an engine of a vehicle.

BACKGROUND/SUMMARY

Air filters positioned within or as part of an air intake system for an engine provide filtered air for the engine. Air filters can extract dust, dirt, and other air borne materials from an engine's air intake system so that air borne material does not collect in the engine and degrade engine performance and operation. However, air borne material can collect within the air filter over time such that the air filter restricts air flow into the engine. The air flow restriction from the air filter can increase engine pumping work and reduce vehicle fuel economy.

Attempts to diagnose air filter restriction include monitoring differential pressure across the air filter during engine operation. One example approach is shown by Bauerle in U.S. Pat. No. 7,444,234. Therein, a barometric pressure is either calculated at engine-off conditions based on output from a manifold absolute pressure (MAP) sensor or during part-throttle engine operating conditions based on one or more of an existing mass air flow, MAP, engine intake throttle position, and engine speed. Further, pressure downstream of the air filter and upstream of the engine intake throttle is estimated based on output from the MAP sensor during high intake air flow conditions such as wide open throttle (WOT) conditions. The difference between barometric pressure (e.g., upstream of the air filter) and pressure downstream of the air filter (e.g., upstream of engine intake throttle) is calculated. If the difference is greater than a threshold, the air filter is determined to be plugged.

The inventors herein have recognized a potential issue with the above approach. For example, air filter diagnosis depends on the engine being operational and intake air flowing into the engine. In a hybrid vehicle, however, the engine may operate for shorter durations. Thus, the air filter diagnostic may not be performed regularly, and further, when performed, the diagnostic may take a longer time for completion. As such, the vehicle may operate with a clogged or blocked air filter for extended periods of time if the air filter diagnostic is not performed or remains incomplete. Further still, restriction of the air filter may reduce air flow into the intake causing a richer air-fuel mixture in the engine, which can foul spark plugs and affect ignition timings.

The inventors herein have recognized the above issue and have developed approaches to at least partially address this issue. In one example, a method for an engine in a hybrid vehicle comprises, during an engine-off condition, indicating degradation of an air filter based on a comparison of atmospheric pressure and a pressure in an intake manifold of the engine, the pressure in the intake manifold being a negative pressure produced via a pump coupled to an evaporative emissions system of the engine. In this way, the air filter may be diagnosed for degradation even during engine-off conditions.

As one example, a hybrid vehicle may include a fuel combusting engine and a motor drawing energy from an energy storage device, e.g. a battery. The vehicle may also include an evaporative emissions system coupled to an evaporative leak check module (ELCM), the ELCM including a pump. When the vehicle is powered off or when the vehicle is propelled primarily by motor torque, a diagnostic to test an air filter in an intake passage of the fuel combusting engine may be triggered. The diagnostic may include activating the pump in the ELCM to evacuate the intake manifold. Specifically, a canister purge valve and an intake throttle may be opened such that operating the pump draws air from an intake manifold and the intake passage downstream of the air filter through the canister purge valve. As such, a negative pressure may be produced downstream of the air filter. Degradation of the air filter may be indicated based on a comparison of barometric pressure upstream of the air filter and the pressure in the intake manifold after operating the pump for a specific duration. Further, in some cases, a remaining lifetime of the air filter may be predicted based on the comparison of barometric pressure and intake manifold pressure.

In this way, an air filter coupled in an engine of a hybrid vehicle may be diagnosed for restriction. Specifically, a state of the air filter may be analyzed even when the engine is deactivated. Further still, the air filter may be assessed for clogging without relying on engine vacuum. A pressure differential may be produced across the air filter by operating a pump included in an ELCM to diagnose the air filter for restriction. By diagnosing restriction of the air filter and predicting a remaining lifetime of the air filter, a vehicle operator may be alerted of a degrading air filter condition and prompted to take corrective actions (such as replacing the air filter) before the air filter becomes fully restricted. Thus, a blocked air filter may be detected earlier allowing the engine to operate more efficiently. As such, fuel economy may be enhanced and engine operation may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
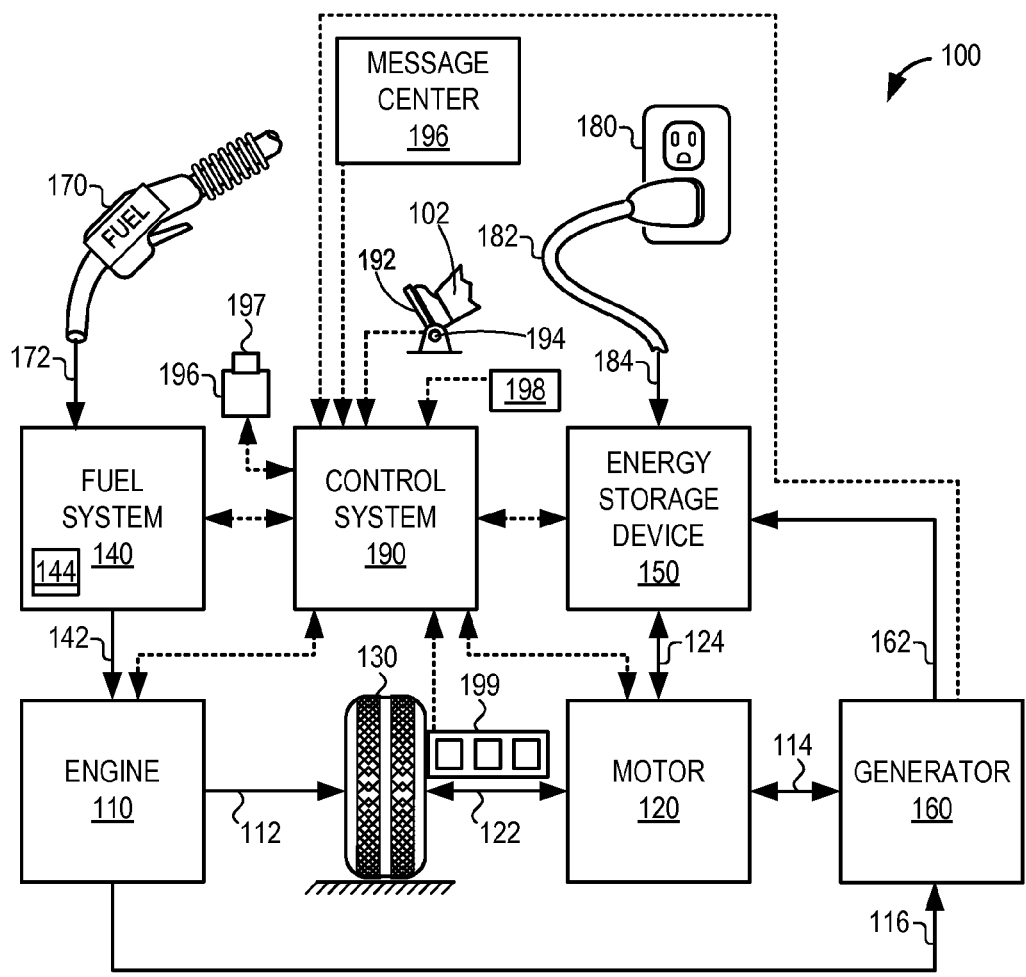
FIG. 1 illustrates an example vehicle propulsion system.
Figure 4:
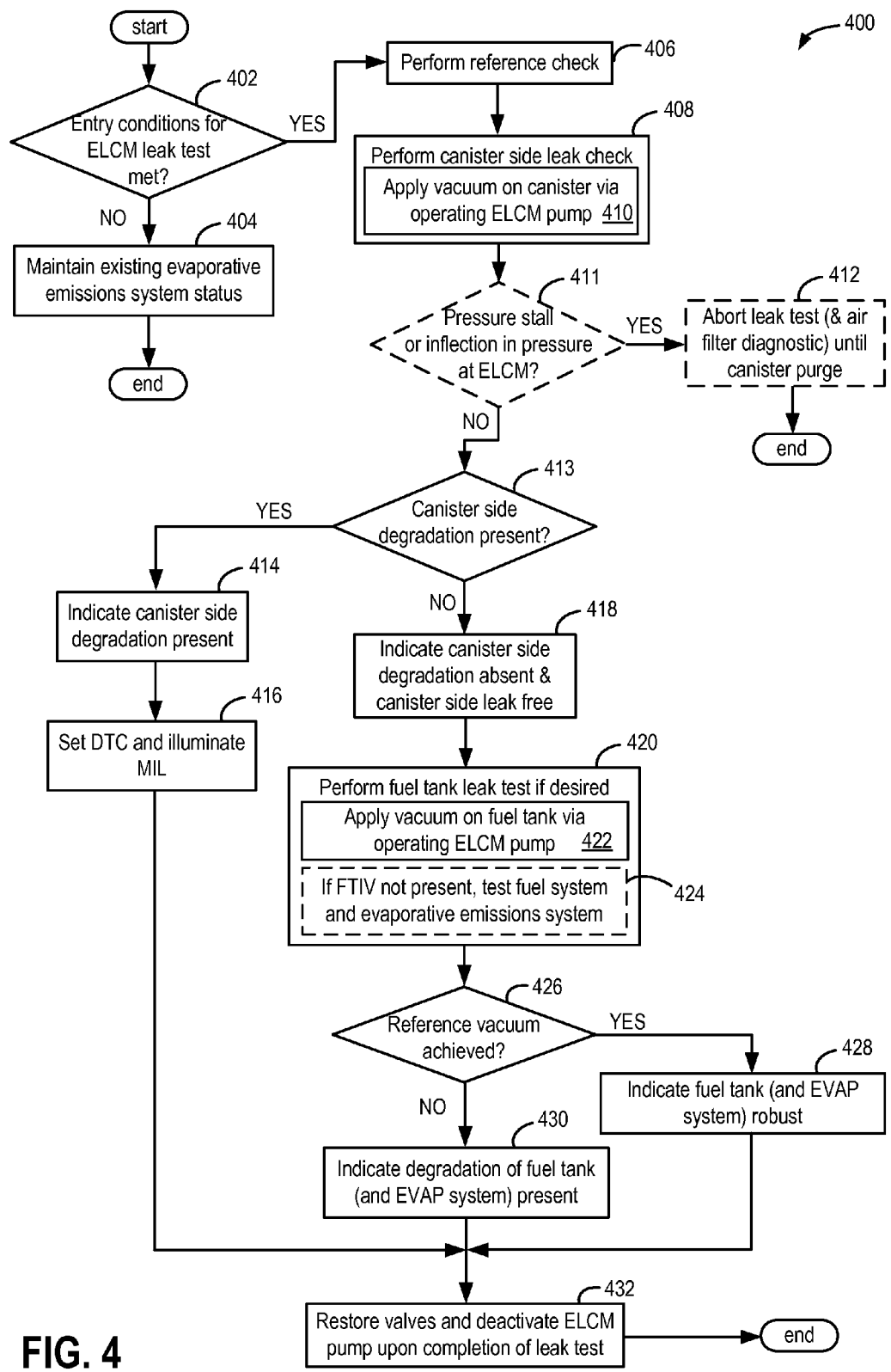
FIG. 4 depicts a high level flow chart of testing an evaporative emissions system for leaks via an evaporative leak check module pump.
Figure 5A:
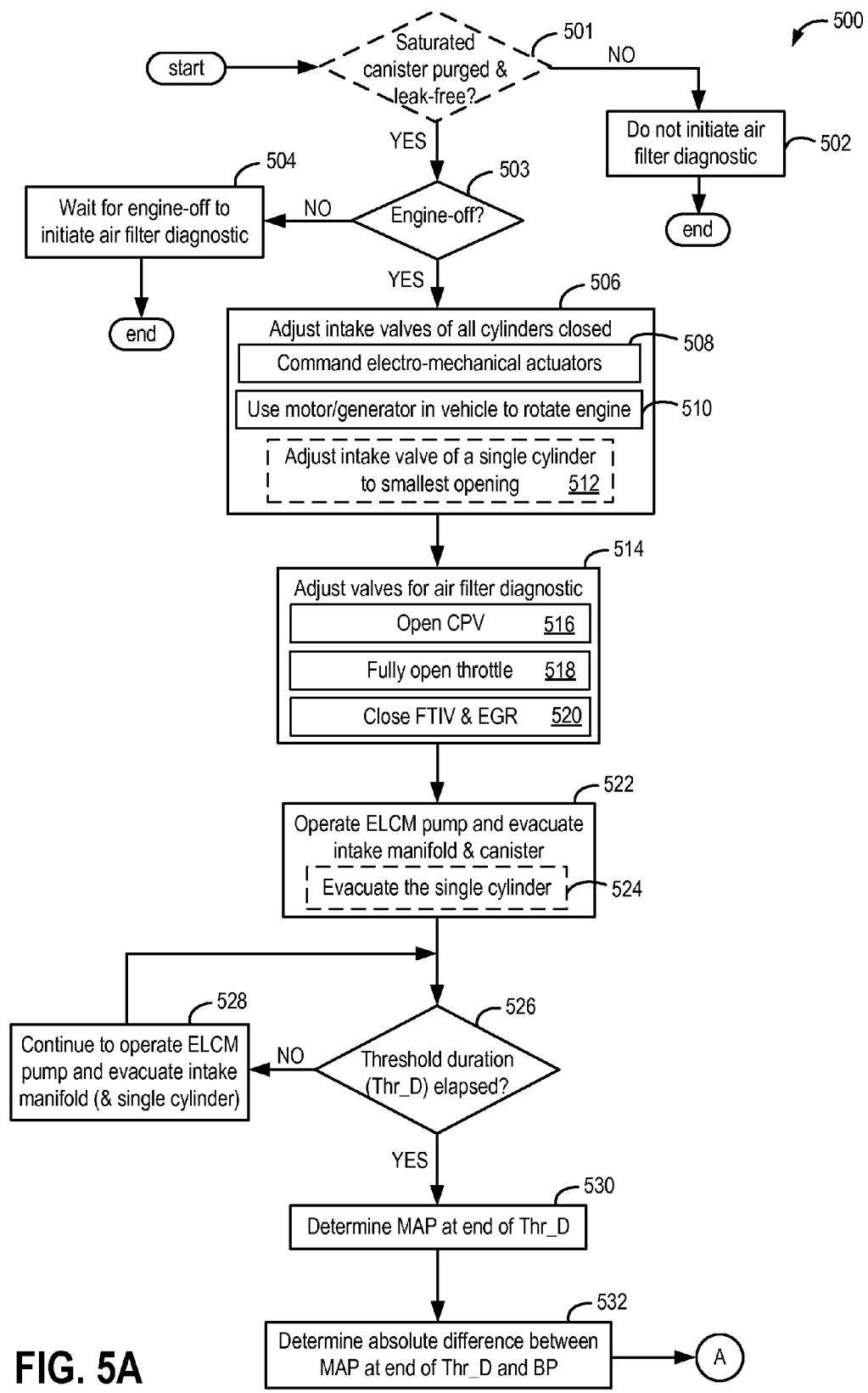
FIGS. 5A and 5B portray a high level flow chart of the air filter diagnostic, in accordance with the present disclosure.
Figure 5B:
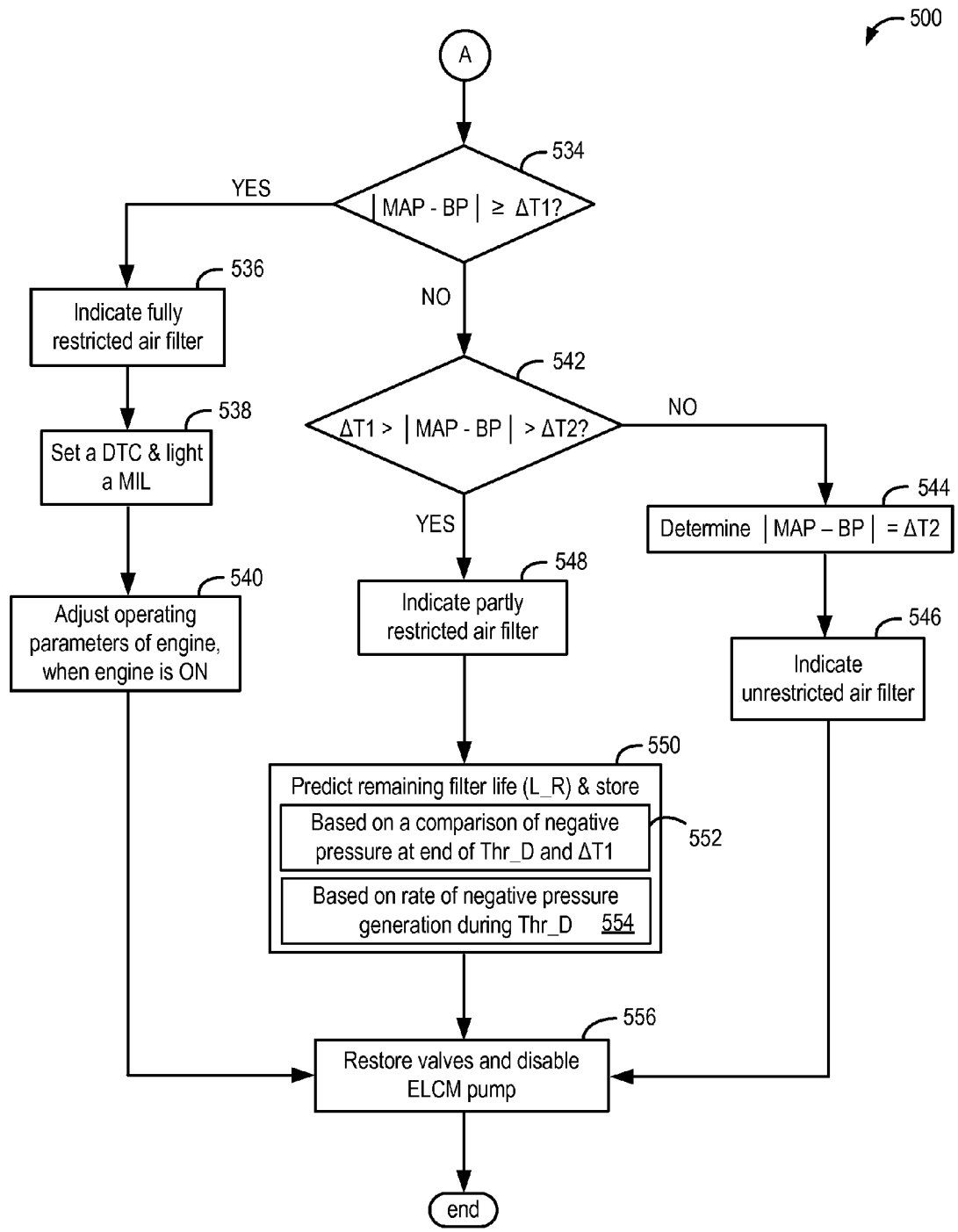
Figure 6:
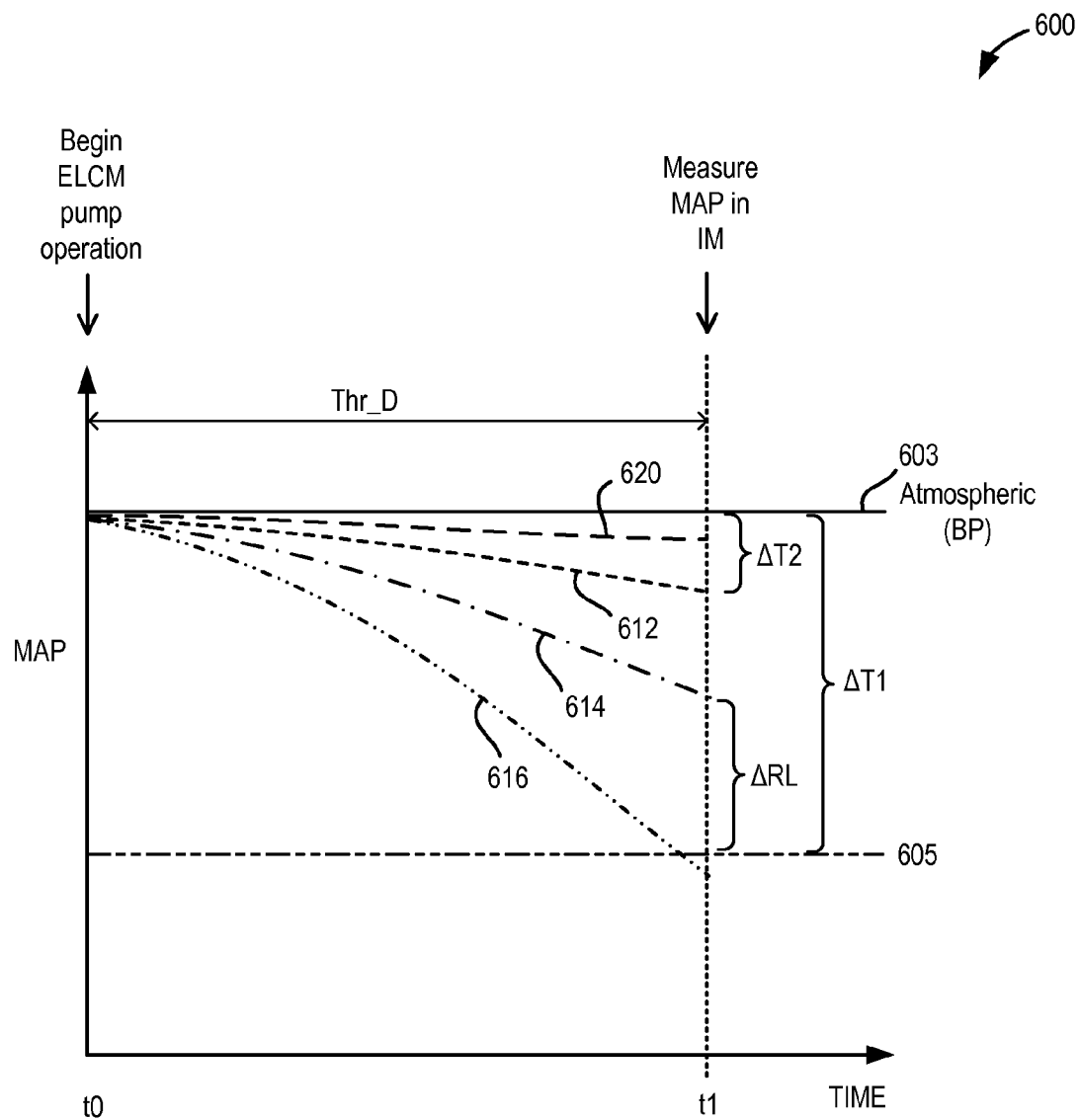
FIG. 6 illustrates a plot of manifold absolute pressure (MAP) against time during the air filter diagnostic based on a status of an air filter.

The following description relates to systems and methods for detecting a level of restriction of an air filter coupled in an engine included in a hybrid vehicle, such as the example vehicle system of FIG. 1. The engine may be coupled to an evaporative emissions system (FIG. 2) which in turn may be coupled to an evaporative leak check module (ELCM). The ELCM module may include a pump which may be fluidically coupled via a canister to an intake manifold of the engine. An air filter diagnostic may be activated (FIG. 3) during an engine-off condition after confirming that the evaporative emissions system is leak free (FIG. 4). The air filter diagnostic may include operating the pump in the ELCM to vary a pressure in the intake manifold. Specifically, the pump may be operated to produce a pressure in the intake manifold via opening each of a canister purge valve and an intake throttle while closing all cylinder intake valves (FIGS. 5A and 5B). In one example, the pressure produced in the intake manifold (and downstream of the air filter) is a negative pressure (FIG. 6). A routine, such as the example routine of FIGS. 5A and 5B, may be configured to indicate degradation of the air filter by comparing barometric pressure with the pressure developed in the intake manifold by operating the pump in the ELCM. For example, the air filter may be clogged and degraded if an absolute difference between barometric pressure and the pressure in the intake manifold is higher than a threshold difference. Another routine, such as the routine of FIG. 7, may be configured to determine if the air filter is installed in a newly assembled vehicle at an end of assembly line station. An example air filter diagnostic is depicted in FIG. 8. Thus, the air filter may be diagnosed for restriction without engine operation.

Regarding terminology used herein, a vacuum may also be termed "negative pressure". Both vacuum and negative pressure refer to a pressure lower than atmospheric pressure. Further, an increase in vacuum may cause a higher level of vacuum as the vacuum approaches absolute zero pressure or perfect vacuum. When vacuum decreases, a level of vacuum reduces as the vacuum approaches atmospheric pressure level. In other words, a lower amount of vacuum indicates a shallow level of vacuum. Said another way, lower vacuum may be a negative pressure that is closer to atmospheric pressure than a higher (or deeper) level of vacuum. A pressure may be termed positive pressure when the pressure is higher than atmospheric (or barometric) pressure.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle. Alternatively, the propulsion system 100 depicted herein may be termed a plug-in hybrid electric vehicle (PHEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated. Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

Fuel in fuel tanks of hybrid vehicles may not be used for combustion for substantially long durations (e.g., months) if the hybrid vehicle is operated in an electric mode (e.g., engine-off mode). The hybrid vehicle may be operated in the electric mode for months if the vehicle operator decides to recharge the energy storage device regularly and constantly and if the vehicle is driven largely on surface streets without activating the engine.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 14. In one example, the control system may adjust engine output and/or the wheel brakes to increase vehicle stability in response to sensor(s) 199.

Figure 2:
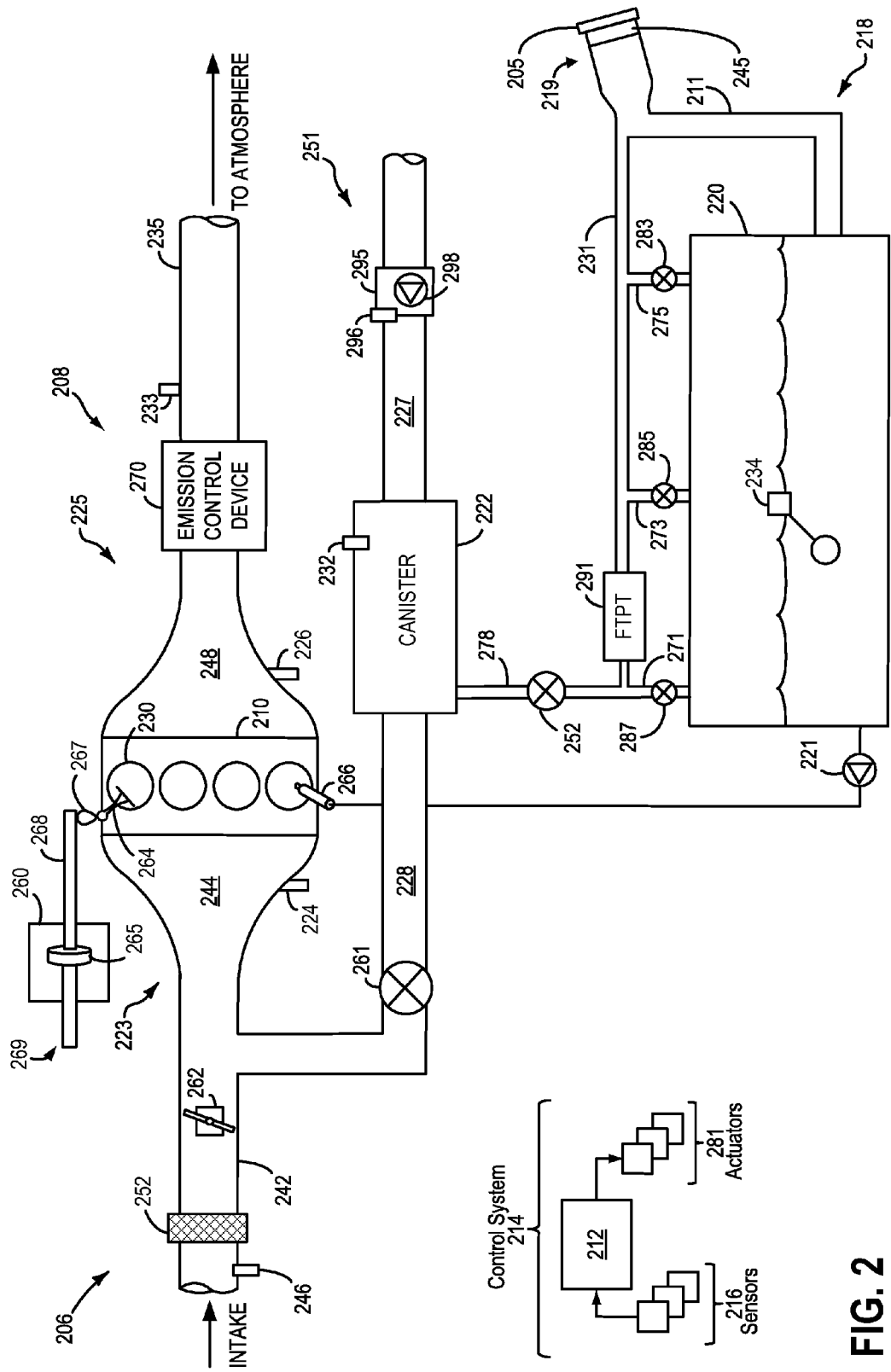
FIG. 2 shows an example vehicle system with a fuel system and an evaporative emissions system.

FIG. 2 shows a schematic depiction of a vehicle system 206. The vehicle system 206 includes an engine system 208 coupled to an evaporative emissions control system 251 and a fuel system 218. Evaporative emissions control system 251 (also termed, evaporative emissions system 251) includes a fuel vapor container or fuel system canister 222 which may be used to capture and store fuel vapors. In some examples, vehicle system 206 may be a hybrid electric vehicle system, such as the vehicle propulsion system 100 of FIG. 1. As such, engine 210 may be similar to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 262 fluidly coupled to the intake manifold 244. Fresh intake air enters intake passage 242 and flows through air filter 252. Air filter 252 positioned in the intake passage 242 may clean intake air before the intake air is directed to the intake manifold 244. Cleaned intake air exiting the air filter 252 may stream past throttle 262 (also termed intake throttle 262) into intake manifold 244 via intake passage 242. As such, intake throttle 262 when fully opened may enable a higher level of fluidic communication between intake manifold 244 and intake passage 242 downstream of air filter 252. An amount of intake air provided to the intake manifold 244 may be regulated via throttle 262 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Each cylinder 230 may be serviced by one or more valves. In the present example, each cylinder 30 includes a corresponding intake valve 264 and an exhaust valve (not shown). Each intake valve 264 may be held at a desired position via a corresponding spring. Engine system 208 further includes one or more camshafts 268 for operating intake valve 262.

In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of $NO_x$, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes a fuel vapor canister 222, via vapor recovery line 231. The fuel vapor canister 222 may also be simply termed canister 222 herein. Fuel vapors stored in fuel vapor canister 222 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evaporative emissions control system 251 may include one or more emissions control devices, such as one or more fuel vapor canisters 222 (also termed, canister 222) filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from canister 222 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

In some examples, the flow of air between canister 222 and the atmosphere may be regulated by a canister vent valve (not shown) coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may be stored within canister 222 and air, stripped off fuel vapors, may then be vented to atmosphere via vent line 227. Fuel vapors stored in fuel vapor canister 222 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into canister 222 and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining canister purge valve 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open canister purge valve 261 while closing FTIV 252. Herein, the vacuum generated by the intake manifold of the operating engine may be used to draw fresh air through vent line 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensor 232. Other sensors such as pressure, temperature, air/fuel ratio, and composition sensors may be coupled to various locations in the vehicle system 206. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 3, 4, 5A, 5B, and 7.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canister 222 to intake manifold 244 via purge line 228.

Leak detection routines may be intermittently performed by controller 212 on evaporative emissions system 251 and fuel system 218 to confirm that the fuel system is not degraded. In one example, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum.

Leak tests may be performed by an evaporative leak check module (ELCM) 295 communicatively coupled to controller 212. ELCM 295 may be coupled to the evaporative emissions system 251 of vehicle system 206. Further, ELCM 295 may be coupled in vent line 227, between canister 222 and the atmosphere. ELCM 295 may include a pump 298, such as a vacuum pump, for applying negative pressure to the fuel system when administering a leak test. ELCM 295 may further include a reference orifice (not shown), a changeover valve (COV) (not shown), and a pressure sensor 296. The COV may be moveable between a first position and a second position. In the first position, air may flow through ELCM 295 via a first flow path. In the second position, air may flow through ELCM 295 via a second flow path. In either the first or second position, pressure sensor 296 may generate a pressure signal reflecting the pressure within ELCM 295. The position of the COV may be controlled by a solenoid via a compression spring. The reference orifice in the ELCM may have a diameter corresponding to the size of a threshold leak to be tested, for example, 0.02". As a reference check, the ELCM may be isolated from the fuel system and evaporative emissions system, and the pump activated to draw a vacuum on the reference orifice. The resulting pressure serves as a reference for leaks of equivalent size. The ELCM can then be coupled to one or both of the fuel system and the evaporative emissions system, and the pump may be activated. If the system(s) is (are) intact, the reference vacuum should be attained.

In some embodiments, the pump 298 may be configured to be reversible. In other words, the pump 298 may be configured to apply either a negative pressure or a positive pressure on the evaporative emissions system and/or fuel system. Operation of pump 298 and the solenoid of the COV may be controlled via signals received from controller 212. Following the applying of vacuum (and/or positive pressure) to the evaporative emissions system or fuel system, a change in pressure at the reference orifice (e.g., an absolute change or a rate of change) may be monitored and compared to a threshold. Based on the comparison, an evaporative emissions system leak and/or a fuel system leak may be diagnosed. As such, the evaporative emissions system alone may be tested for leaks (e.g., termed a canister side leak) by closing the FTIV 252 and isolating the fuel tank 220 from the ELCM 295.

Air filter 252 in the engine may become clogged with dust, dirt, and other contaminants as the air filter cleans intake air. The air filter may be particularly clogged if the vehicle is operated largely on dusty roads. A dirty or restricted air filter may produce a significant decrease in gas mileage or fuel economy. As such, the clogged air filter may adversely affect an amount (or volume) of clean intake air delivered to the engine and may cause potential issues with the emissions control system. Further, a reduction in intake air flow may produce a richer than desired air-fuel ratio, which can lead to fouling of spark plugs.

In the present disclosure, the pump 298 (also termed, ELCM pump 298) in the ELCM 295 may be advantageously utilized to test the air filter for degradation (e.g. restriction of air filter) resulting from clogging. Specifically, the pump 298 may be operated to create a differential pressure across the air filter 252 and a status of the air filter may be assessed. The pump 298 in the ELCM may be operated during an engine-off condition to evacuate the intake manifold 244 by opening each of the CPV 261 and intake throttle 262. By opening the intake throttle, air from downstream of the air filter 252 may be evacuated via purge line 228, past CPV 261, and through canister 222. If a higher vacuum is produced in the intake manifold (and downstream of the air filter 252), the air filter 252 may be diagnosed to be substantially restricted. However, if the pressure in the intake manifold remains closer to atmospheric pressure, the air filter may be substantially clean and clear. In particular, the air filter status may be diagnosed during engine-off conditions, such as when the vehicle system 206 is powered off or when the vehicle system 206 (or vehicle propulsion system 100 of FIG. 1) is being propelled primarily by motor torque. Thus, the air filter may be assessed without engine operation and engine vacuum.

Figure 3:
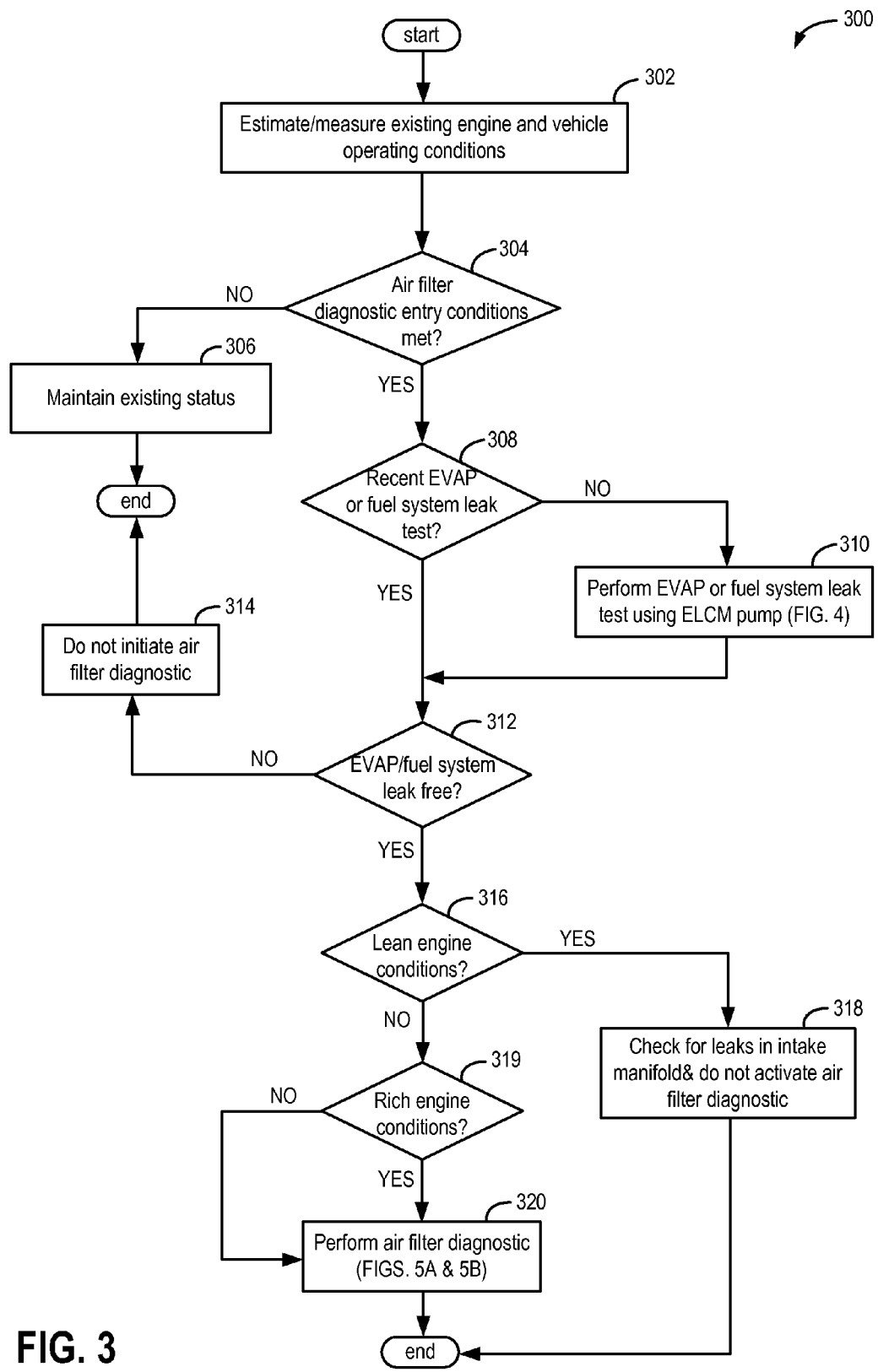
FIG. 3 presents a high level flow chart for initiating an air filter diagnostic.

Turning now to FIG. 3, it depicts an example routine 300 for initiating an air filter diagnostic. The air filter diagnostic may be initiated based on existing conditions including whether a leak check of the evaporative emissions system was recently performed. Routine 300 will be described in relation to the systems shown in FIGS. 1 and 2 but it should be understood that similar routines may be used with other systems without departing from the scope of this disclosure. In one example, routine 300 may be performed in a non-hybrid vehicle. In another example, routine 300 may be performed in a PHEV. Instructions for carrying out routine 300 included herein may be executed by a controller, such as controller 212 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 302, routine 300 includes estimating operating conditions. Operating conditions may be estimated and/or measured. Example operating conditions may include various vehicle conditions, such as vehicle operating mode, battery state-of-charge (SOC), vehicle speed, etc., various engine operating conditions, such as engine speed, engine load, etc., and various ambient conditions, such as temperature, barometric pressure, humidity, date, time, etc. In addition to engine conditions, fuel system conditions may also be monitored, such as fuel tank pressure, fuel fill in a fuel tank, etc. Operating conditions may be measured by one or more sensors coupled to a controller, such as sensors 216 shown coupled to controller 212, or may be estimated or inferred based on available data.

Routine 300 proceeds to 304 after evaluating operating conditions. At 304, routine 300 includes determining if entry conditions for performing an air filter diagnosis are present. In one example, air filter diagnostic conditions may include engine-off conditions following a vehicle-off event. It will be noted that engine-off conditions include the engine being shut down to rest such that the engine is not undergoing combustion. A vehicle-off event may include a key-off event, the vehicle being shut down, or powered off, or the vehicle being placed in a parked mode without propulsion. As such, during the vehicle-off mode the vehicle may not draw power from either the engine or an energy storage device.

In another example, such as in a hybrid vehicle, air filter diagnostic conditions may also include engine-off conditions while the vehicle is being operated using an auxiliary power source. For example, in hybrid vehicle applications, engine-off conditions may occur during vehicle operation while the vehicle is in motion with the engine-off. Herein, the motor and/or generator may be providing torque to propel the vehicle while the engine is at rest. In another example, entry conditions may be based on an amount of time or distance driven since a previous air filter diagnosis being greater than a threshold amount of time or distance.

In still another example, air filter diagnosis may be activated based on results from leak testing an evaporative emissions control system and/or a fuel system. For example, air filter diagnosis may be activated after performing an engine-off evaporative emissions (EVAP) leak test wherein the leak test indicates a robust system. It will be noted that the air filter diagnostic and the EVAP leak test may be performed separately each having different entry criterion and boundaries. However, the air filter diagnostic may not be performed until leak integrity of the canister (or EVAP system) is ensured. By confirming that the canister is leak free, inaccurate results of air filter degradation may be reduced, as will be explained further below.

The air filter diagnostic may also be initiated based on an existing battery SOC. As an example, the air filter diagnostic uses battery power during the engine-off condition to operate the ELCM pump. Accordingly, the air filter diagnostic may be initiated responsive to sufficient battery SOC.

If air filter diagnostic entry conditions are not met, routine 300 proceeds to 306 to maintain existing status of the vehicle. For example, a CPV may be maintained in its position based on existing conditions. For example, the CPV may be maintained closed if purging conditions are not present. Routine 300 then ends.

On the other hand, if air filter diagnostic entry conditions are met, routine 300 proceeds to 308 to determine if an evaporative emissions (EVAP) system leak test, or a fuel system leak test including a canister side leak test, was recently performed. In one example, such as when the hybrid vehicle is propelled by motor torque alone, a recent performance of the EVAP system leak test may include a test performed in the ongoing drive cycle. In another example, a recent EVAP leak test may be a leak test conducted within a threshold interval prior to the anticipated air filter diagnostic. For example, the threshold interval may be 30 minutes. In another example, the threshold interval may be 60 minutes. Leaks in the evaporative emissions system may occur by intrusion and/or environmental change such as vehicle vibration or dynamics, cycling of valves, refueling events where a capless unit is engaged, and through thermal expansion and contraction. Thus, if the EVAP system leak test executed in a recent time period prior to the air filter diagnostic in a static key-off condition, and the EVAP system was diagnosed to be robust, the air filter diagnostic may be initiated without repeating the EVAP leak test again.

A canister side leak test may be performed by closing the FTIV and isolating the fuel tank from the ELCM. The canister side leak test may specifically test the canister, vent line, and a portion of the purge line for leaks. Herein, the canister side may be evacuated by operating the pump in the ELCM and comparing the pressure achieved with a reference pressure or threshold. If the fuel tank cannot be isolated, such as in a vehicle that does not include a FTIV, the fuel system and the canister may be tested together for leaks based on comparing a pressure produced by operating the pump of the ELCM and comparing the pressure developed in the fuel system with a reference pressure.

As such, the air filter diagnostic may not be performed without confirming an absence of leaks (e.g., vapor leaks) in the evaporative emissions system and/or in the fuel system. The air filter diagnostic in the present disclosure employs the pump of the ELCM to produce a differential pressure across the air filter. As the ELCM pump may be coupled to the intake manifold of the engine via the fuel vapor canister, leaks in the evaporative emissions system (specifically, the canister) may provide inaccurate results about air filter status. For example, a leak in the evaporative emissions system may erroneously indicate that the air filter is not restricted even though the air filter may be degraded. Accordingly, the air filter diagnostic may be initiated only after confirming that the evaporative emissions system (e.g., canister) and/or fuel system is free of leaks.

Thus, if it is determined that a recent canister side leak test or a recent fuel system leak test was not performed, routine 300 continues to 310. At 310, a leak test of the canister and/or the fuel system may be performed. For example, the leak test may be performed in a "stealth" mode wherein the leak test may not set diagnostic trouble codes in the memory of the controller. Specifically, the ELCM pump may be operated to perform the leak test of the fuel system and/or evaporative emissions system. As such, routine 400 of FIG. 4 may be triggered at 310. Routine 400 includes performing a reference check by isolating each of the fuel system and the evaporative emissions system to determine a threshold pressure attained by operating the ELCM pump. Next, the ELCM pump may be operated again after unsealing the fuel system and the evaporative emissions system. Further, a pressure developed in the system (e.g., the fuel system, the evaporative emissions system) may be compared to the threshold pressure to detect the presence of leaks. Routine 400 will be described in detail in reference to FIG. 4 below. Upon performing the leak test, routine 300 continues to 312.

If a recent leak test is confirmed at 308, or after performing the leak test at 310, routine 300 progresses to 312 to determine if the EVAP system was found to be free of leaks. As such, if the fuel tank has been tested along with the canister, routine 300 may determine at 312 if the fuel system and evaporative emissions system was indicated as leak free in the recently performed leak test. If no, routine 300 proceeds to 314 to not initiate the air filter diagnostic. Specifically, the air filter diagnostic is not activated responsive to determining that the evaporative emissions system (and/or the fuel system) includes leaks (e.g., vapor leaks). As such, routine 300 may set a flag to retry the air filter diagnostic at a later time after the evaporative emissions system (and/or fuel system) is leak free.

Conversely, if the canister side leak test (or fuel system leak test) indicates that leaks are absent at 312, routine 300 progresses to 316 to determine if lean engine conditions were detected during preceding engine operation. Lean engine conditions may indicate that the intake manifold has air leaks and unmetered air is entering the engine via leaks in the intake manifold. For example, a leaky canister purge valve may allow additional air into the engine intake manifold. A lean engine condition may be determined based on the output of an EGO sensor, such as sensor 226 of FIG. 2. A lean engine diagnostic code may be set if the EGO sensor output indicates that an exhaust oxygen content is above a threshold for a previously determined duration. As such, routine 300 may check for lean engine diagnostic trouble codes that may be set by the controller in response to lean engine conditions. Lean diagnostic codes may also be indicated in response to degraded mass air flow sensors and/or issues with fuel delivery.

If it is determined that lean engine conditions were detected, routine 300 proceeds to 318 to initiate a check for sources of leaks in the intake manifold when entry conditions are met. As such, if the intake manifold has leaks, the air filter diagnostic may produce unreliable results. Accordingly, the air filter diagnosis may not be activated if lean engine conditions are found in the engine. It will be noted that lean engine conditions may be determined when the engine is operational.

On the other hand, if lean engine conditions are not detected, routine 300 continues to 319 to determine if rich engine conditions were detected or indicated during preceding engine operation. In one example, rich engine conditions may occur when the air filter is significantly degraded and clogged. To elaborate, a clogged air filter may reduce intake air flow leading to a richer air/fuel ratio being generated in the engine. In another example, rich engine conditions may also be caused by a leaky fuel injector. If rich engine conditions are confirmed, routine 300 proceeds to 320 to perform the air filter diagnostic. Since rich engine conditions may be indicative of a degraded air filter, the air filter diagnostic may be desired. As such, even if rich engine conditions are not confirmed, routine 300 proceeds to 320 to perform the air filter diagnostic as air filter diagnostic entry conditions were met earlier at 304. At 320 routine 500 of FIGS. 5A and 5B is initiated. Specifically, a pressure may be produced in the intake manifold via the ELCM pump, and a pressure difference across the air filter may be computed to indicate air filter restriction. Routine 500 of FIGS. 5A and 5B will be described further below.

Thus, the air filter diagnostic may be initiated during engine-off conditions responsive to each of the canister and fuel system (or evaporative emissions system) being leak-free as well as the intake manifold being free of leaks. Specifically, the air filter diagnostic may not be activated if either the fuel system (or evaporative emissions system) or the intake manifold is determined to be degraded due to leaks. In addition, the air filter diagnostic may be initiated once a threshold duration or a threshold distance since a previous air filter diagnostic is surpassed.

Referring now to FIG. 4, it depicts routine 400 illustrating an example evaporative emissions leak test conducted with an ELCM pump. Specifically, the pump of the ELCM may be operated to determine if the fuel system and/or evaporative emissions system can develop a vacuum that is equal to or exceeds a threshold (or reference) vacuum. Routine 400 will be described in relation to the systems shown in FIGS. 1 and 2 but it should be understood that similar routines may be used with other systems without departing from the scope of this disclosure. In one example, routine 400 may be performed in a non-hybrid vehicle. In another example, routine 400 may be performed in a PHEV. Instructions for carrying out routine 400 included herein may be executed by a controller, such as controller 212 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 402, routine 400 includes determining if entry conditions for an ELCM leak test are met. Specifically, the ELCM leak test may test one or more of the evaporative emissions system including the canister, and the fuel system for leaks. The leaks, in one example, may be vapor leaks. Entry conditions for the ELCM leak test may include an engine-off status, and/or determining that the fuel system is not undergoing a purge operation. The engine-off status, as mentioned earlier, includes an engine shut down to rest. If entry conditions are not met, routine 400 proceeds to 404 to maintain an existing status for the evaporative emissions system and/or the fuel system. As an example, if a purge operation is being performed, the canister purge valve may be maintained open. On the other hand, if the engine-off event is not confirmed, existing engine operation may be continued. Further, at 404, routine 400 may also include recording that an ELCM test was aborted, and may further include setting a flag to retry the ELCM test at a later time point.

If entry conditions for an ELCM test are met, routine 400 proceeds to 406 to perform an ELCM reference check. An ELCM reference check may comprise closing (or maintaining closed) a canister vent valve (if present), placing a COV in a first position, and activating an ELCM pump. Herein, the pump may produce a vacuum or negative pressure at the reference orifice of the ELCM. A pressure sensor, such as pressure sensor 296 may record the resulting vacuum level in the ELCM, after a certain amount of time, or when the vacuum level has reached a plateau. The recorded vacuum level at the end of the reference check may be used as a vacuum threshold to signify the expected vacuum attainable for a systemic leak with a diameter equivalent to the reference orifice. In one example embodiment, the reference orifice may have a diameter of 0.02", but the reference orifice may have a smaller or greater diameter in other embodiments.

Continuing at 408, routine 400 may include performing a canister side leak test. In other words, the leak test may assess a part of the evaporative emissions system, specifically the canister, for degradation. With reference to FIG. 2, the canister side test may comprise closing (or maintaining closed) FTIV 252, closing (or maintaining closed) canister purge valve 261, opening a canister vent valve, if present, placing the COV in the second position, and activating the ELCM pump 298. Activating the ELCM pump, which may be electrically actuated, may include sending a signal from the controller to an actuator to activate the ELCM pump by supplying electrical power to the ELCM pump. The ELCM pump may receive power from a system battery.

Specifically, at 410, the ELCM pump may apply a vacuum on the canister and associated components of the evaporative emissions system, as the fuel tank is isolated by closing the FTIV. For example, the ELCM pump may apply the vacuum on a portion of vent line 227, the canister 222, and a portion of each of purge line 228 and conduit 278. In this configuration, as pump 298 pulls a vacuum on the canister side of fuel system 218, the absence of a leak in the canister and the evaporative emissions system should allow for the vacuum level in ELCM 295 to reach or exceed the previously determined vacuum threshold. In the presence of a leak larger than the reference orifice, the pump will not pull down to the reference check vacuum level. In other words, a lower amount of vacuum (e.g., lower than the vacuum produced at reference orifice) may be produced in the canister and evaporative emissions system if a leak larger than the reference orifice is present. The pull down may be executed until the reference vacuum is met, for a time period that is predetermined, or for a time period based on current conditions.

At 411, routine 400 may optionally check for a pressure stall in the ELCM or an inflection in pressure at the ELCM. Herein, routine 400 checks for hydrocarbon breakthrough from the canister. For example, the canister of the EVAP system in a hybrid vehicle may not be purged at regular intervals as the hybrid vehicle may be operating with motor torque alone for longer durations. In other words, durations of vehicle propulsion by engine operation may be reduced leading to fewer occasions and infrequent opportunities for canister purge. Accordingly, the canister may be saturated with stored fuel vapors. If a leak test is performed on the canister while the canister is saturated with fuel vapor, hydrocarbon breakthrough may occur and result in bleed emissions as well as false leak detection. Hydrocarbon breakthrough from the fuel vapor canister may be indicated by an inflection point in the fuel vapor canister side pressure upon vacuum application via the ELCM. The emergence of hydrocarbons from the canister increases the work load of the ELCM, and may cause the vacuum to decay to atmospheric pressure. In other words, pressure at the ELCM may inflect from an increasing vacuum to a decreasing vacuum.

If it is confirmed that an inflection in pressure or a pressure stall is observed at the ELCM while applying vacuum on the canister, routine 400 continues to 412 to abort the leak check until a canister purge is performed. Degradation of the canister side may not be indicated. As such, continuing to apply a vacuum to the canister in this scenario will result in hydrocarbon emission into the atmosphere. Further, as the reference threshold will not be met, the leak check will result in an incorrect indication of degradation in the canister. If canister saturation is confirmed via the inflection of pressure at 411, routine 400 may also abort any subsequent air filter diagnostic as the air filter diagnostic also includes applying a vacuum to the canister via the ELCM.

On the other hand, if a pressure stall or inflection of pressure is not confirmed, routine 400 proceeds to 413. As such, the leak test may be continued. At 412, routine 400 includes determining whether the canister side is degraded. Specifically, routine 400 determines if the vacuum developed in at least a portion of the evaporative emissions system while operating the ELCM pump during the ELCM leak test is greater than or equal to the vacuum threshold determined at 406. If a leak is detected (e.g., the canister side vacuum does not reach the vacuum threshold during an allotted time period), routine 400 proceeds to 414 to indicate degradation of the canister side, and therefore the evaporative emissions system. In other words, routine 400 may indicate presence of a canister side leak. Next, at 416, a diagnostic trouble code (DTC) associated with a canister side leak is set, and a malfunction indicator lamp (MIL) is lit. Routine 400 then proceeds to 432 to de-activate the ELCM pump, and restore various valves, such as adjusting the COV to the first position, closing the canister vent valve (if present), opening the FTIV, if desired, etc. It will be noted that if the evaporative emissions system, e.g. canister side, is determined to be degraded, the fuel system including the fuel tank may not be tested for leaks.

If the vacuum developed in the evaporative emissions system attains or exceeds the vacuum threshold, the canister side may not be degraded. Thus, if no leak greater than or equal to the reference orifice (e.g., 0.02") is detected on the canister side at 412, routine 400 continues to 418 to indicate that the canister side (or the evaporative emissions system) is not degraded. To elaborate, the canister side and the evaporative emissions system may be determined to be leak free. If a fuel tank leak test is indicated or desired, routine 400 then progresses to 420 to perform the fuel tank leak test. It will be noted that if the vehicle does not include the FTIV, routine 400 may not perform the canister side leak check.

Further, routine 400 may continue directly to 420 from 406, and 408-418 may not be performed.

Performing the fuel tank leak test may include testing the fuel system, inclusive of fuel tank and associated valves, conduits, etc., for leaks. Herein, the FTIV may be opened while maintaining the CPV closed (or closing the CPV if open) and the ELCM pump may be operated to evacuate the fuel tank. Thus, at 422, the ELCM pump is operated to produce a vacuum in the fuel system and part of the evaporative emissions system. Specifically, the COV may be adjusted to the second position while operating the ELCM pump, and the canister vent valve, if present, may be maintained open. In this configuration, both the fuel tank and the canister side of the fuel system are fluidically coupled to the ELCM pump. Thus, when the ELCM is operated, a vacuum may be applied on each of the fuel system (e.g., fuel tank) and the evaporative emissions system. Particularly, evacuating the fuel tank may include evacuating the entire fuel system and the evaporative emissions system. The fuel tank evacuation may be executed until the reference vacuum (e.g., vacuum threshold determined at 406) is met, for a time period that is predetermined, or for a time period based on current conditions.

It will be noted that, at 424, if the FTIV is not present in the vehicle system, the leak test at 420 may test both the fuel tank and the evaporative emissions system for degradation in the form of leaks. Further, canister saturation may also be determined as shown earlier at 411.

Next, at 426, routine 400 determines if the reference vacuum was attained during the fuel tank evacuation period. Specifically, pressure in the ELCM is monitored by observing output from pressure sensor 296. If the reference vacuum is not attained, routine 400 proceeds 430 to indicate degradation of the fuel system, e.g. presence of leaks. If routine 400 performed the canister side leak test and indicated that the canister side was leak free, routine 400 may specifically indicate a fuel tank side leak. Indicating a fuel tank (or fuel tank side) leak may include recording the test result, and may further include illuminating an MIL. If the vehicle does not include a FTIV, routine 400 may indicate a leak in the fuel system and the evaporative emissions system. On the other hand, if the reference vacuum is achieved at 426, routine 400 progresses to 428 to indicate that the fuel tank (and fuel system) and evaporative emissions system is robust and free of leaks.

Routine 400 then continues to 432 to restore valves and disable the pump of the ELCM. As an example, the pump in the ELCM may be shut down. For example, the controller may communicate a signal to terminate providing power to the ELCM pump. Further, the FTIV may be maintained open and the canister vent valve, if present, may be maintained open. Routine 400 then ends.

In this manner, the fuel system and the evaporative emissions system may be tested for degradation, such as the presence of vapor leaks. The ELCM pump may be utilized for performing the leak tests when the engine is shut down to rest. Once the canister is determined to be leak free, the air filter diagnostic may be initiated. As such, the air filter diagnostic may include utilizing the same ELCM pump that was used in the leak test for the EVAP system (in routine 400). If the vehicle does not include a FTIV, the air filter diagnostic may be activated after confirming a lack of leaks in the fuel system (inclusive of canister). It will be noted that while the ELCM pump is presented as a vacuum pump in the above example, the ELCM pump may be reversible and may perform leak tests using positive pressure instead of or in addition to using vacuum.

Turning now to FIGS. 5A and 5B, they present an example routine 500 illustrating an air filter diagnostic test according to the present disclosure. Herein, the ELCM pump is operated to evacuate the intake manifold to produce a negative pressure in the intake manifold, downstream of the air filter. Degradation or a degree of restriction of the air filter may be determined based on a comparison of atmospheric pressure and the negative pressure produced in the intake manifold.

Routine 500 will be described in relation to the systems shown in FIGS. 1 and 2 but it should be understood that similar routines may be used with other systems without departing from the scope of this disclosure. Instructions for carrying out routine 500 included herein may be executed by a controller, such as controller 212 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below.

At 501, routine 500 optionally confirms that the canister, if saturated, has been purged. As such, if canister saturation is detected (either via a hydrocarbon sensor in vent line 227 or by the inflection in pressure as at 411 in routine 400), the leak test of the canister side may not be performed. Further, routine 500 also confirms if the canister is leak free. The air filter diagnostic may not be initiated if the canister side is not confirmed to be leak free. Accordingly, routine 500 may confirm that the canister has been purged and is leak free before starting the air filter diagnostic. If a purge operation of the saturated canister is not confirmed and the canister is not confirmed to be leak free, routine 500 proceeds to 502 where the air filter diagnostic is not initiated. Routine 500 then ends. On the other hand, if a purge operation has been performed on the canister and the canister is confirmed to be leak free, routine 500 proceeds to 503.

At 503, routine 500 includes confirming that the engine of the vehicle, such as vehicle system 206, is deactivated. Specifically, an engine-off condition may be confirmed wherein the engine is shut down to rest without combustion. The air filter diagnostic of routine 500 may be activated solely when the engine is shut down and vacuum is not present in the intake manifold due to engine operation. Thus, if the engine-off condition is not confirmed, routine 500 continues to 504 to wait for a subsequent engine-off condition to perform the air filter diagnostic. As such, routine 500 may maintain existing operation such as, if the engine is operating under specific conditions, these specific conditions may be maintained. The routine may also include setting a flag to retry the air filter diagnostic at a later engine-off. Routine 500 then ends.

Conversely, if the engine is confirmed to be shut down to rest, routine 500 progresses to 506 to adjust intake valves of all cylinders to closed position. Specifically, all intake valves of all cylinders of the engine may be adjusted to their respective fully closed positions. By closing the intake valves of all cylinders of the engine, a volume to be evacuated by the ELCM pump may be reduced. Alternatively, a mix of intake valves and exhaust valves of the engine cylinders may be shifted to their fully closed positions. In one example, at 508, electro-mechanical actuators may be commanded to fully close all the intake valves of each cylinder of the engine. Specifically, electromechanical actuators of intake valve actuation system 269 of FIG. 2 may be actuated to adjust the intake valves of all cylinders to fully closed. In some examples, the intake valves may be actuated by hydraulic actuators. Consequently, the engine cylinders may not fluidically communicate with the intake manifold.

In another example, such as in a hybrid vehicle or PHEV, closing cylinder intake valves includes operating a motor and/or generator at 510 to rotate the engine position from a position at engine-off to a position where at least each intake valve of each cylinder is fully closed. For example, during a shutdown, the engine may be spun to rest at a position that is suited for cranking and restarting quickly. As an example, the engine may be spun to a position where at least one cylinder is in an intake stroke. While this position may be suited for engine restart, such a position may increase the volume to be evacuated by the ELCM pump. Therefore, to ensure that the volume to be evacuated by the ELCM pump is reduced (e.g., a minimum), the engine may be moved from the position at rest (that is suited for restart) to a position that is suited for blocking fluid flow from the cylinders. Once the air filter diagnostic is completed, the generator or motor may be used to reposition the engine back to the original position for swift cranking and restart.

In yet another example, at 512, the engine is optionally parked at a position that provides a reduced air leakage between the intake manifold and a single cylinder. For example, the motor or generator may adjust the position of the engine such that intake valve(s) of the single cylinder are positioned at a reduced opening, e.g. smallest opening. The remaining cylinders of the engine (e.g., cylinders other than the single cylinder) may be parked such that their intake valves are fully closed. As an example, if the engine comprises four cylinders, one cylinder of the four cylinders may be positioned such that intake valves of the one cylinder are at their smallest opening. Further, the remaining three cylinders of the engine may be positioned such that their intake valves are fully closed. Herein, a first of the remaining three cylinders may be situated in a compression stroke, a second of the remaining three cylinders may be positioned in a power stroke, and a third of the remaining three cylinders may be positioned at a beginning of an exhaust stroke. Specifically, the intake valve(s) of the remaining three cylinders may be fully closed but an exhaust valve(s) of the third of the remaining three cylinders may be at slightly open.

At 514, routine 500 includes adjusting additional valves for the air filter diagnostic. In particular, at 516, the CPV may be adjusted open, from closed. As an example, the CPV may be adjusted from fully closed to fully open. Herein, the controller may communicate a signal to a solenoid of the CPV to increase an opening of the CPV to allow fluidic communication between the intake manifold and the ELCM pump (across the canister). Further, at 518, the intake throttle may be adjusted to fully open. In one example, an electro-mechanical actuator of the intake throttle may shift a position of the intake throttle from fully closed to fully open. In another example, the controller may command the electro-mechanical actuator coupled to the intake throttle to modify the position of the intake throttle from mostly closed to fully open. As such, an opening of the intake throttle may be increased (e.g., to a maximum). For example, the intake throttle may be fully opened as at a wide open throttle engine condition. By positioning the intake throttle at fully open, pressure in the intake passage downstream of the air filter may be modified (e.g., reduced) by operating the ELCM pump. Further, the pressure downstream of the air filter may be learned from a MAP sensor located in the intake manifold.

Further still, at 520, the FTIV, if present, is adjusted closed so that when the ELCM pump is operated, the fuel tank may not be evacuated. Herein, the fuel tank is isolated from the ELCM by fully closing the FTIV. If an exhaust gas recirculation (EGR) valve is present, the EGR valve is adjusted closed. As such, the EGR valve may be moved to fully closed position, if open, blocking air leaks from the exhaust passage.

Thus, various valves are adjusted to enable fluidic communication between the intake manifold (as well as a portion of the intake passage between air filter 252 and intake throttle 262) and the ELCM pump while reducing the volume that is to be evacuated by the ELCM pump. By opening the intake throttle and the CPV, the ELCM pump can draw air from downstream of the air filter as well as air from the intake manifold. It will be noted that downstream of the air filter includes a volume of the intake passage and intake manifold that receives air from the air filter. A volume upstream of the air filter may include a volume that is open to the atmosphere. In other words, the volume upstream of the air filter may include air that is yet to flow through the air filter. By closing the intake valves of all engine cylinders, the volume to be evacuated by the ELCM pump may be reduced. As such, if the intake valves are placed at open, the ELCM pump may be evacuating additional volume from respective engine cylinders.

At 522, the ELCM pump is activated. As mentioned earlier, the ELCM pump may receive electrical power from a battery. The ELCM pump is operated to evacuate the intake manifold as well as the canister of the evaporative emissions system. In other words, operating the ELCM pump may produce a pressure in the intake manifold. Referring to FIG. 2, the ELCM pump 298 may evacuate a portion of the evaporative emissions system including a portion of vent line 227, the canister 222, purge line 228, intake manifold 244, as well as the portion of the intake passage 242 downstream of the air filter 252. Further, if the engine is parked such that a single cylinder has its intake valve(s) at slightly open, the single cylinder is also evacuated at 524. The remaining cylinders may not be evacuated as their intake valves are fully closed. In other words, a negative pressure may be produced in the intake manifold downstream of the air filter by operating the ELCM pump. As such, the canister may also experience a negative pressure while the ELCM pump is operated.

Next, at 526, routine 500 determines if a threshold duration, Thr_D, has elapsed. In one example, Thr_D may be 30 seconds. In another example, the ELCM pump may be operated for a duration of 2 minutes. Alternative durations of Thr_D may be contemplated without departing from the scope of this disclosure. In yet another example, the threshold duration may be a duration based on existing vehicle conditions. Thus, the ELCM pump may be operated for at least the threshold duration.

If it is determined that the threshold duration is not elapsed, routine 500 continues to 528 to maintain ELCM pump operation and continues to evacuate the intake manifold (and single cylinder, if intake valves of the single cylinder are slightly open). Routine 500 then returns to 526. On the other hand, if the threshold duration has been completed, routine 500 progresses to 530 to determine a pressure in the intake manifold (MAP). Specifically, the pressure in the intake manifold may be determined at the end of the threshold duration. The controller may receive readings from a MAP sensor, such as MAP sensor 224 of FIG. 2. It will be noted that the output of the MAP sensor may indicate the pressure in the intake manifold as well as a region of the intake passage between the air filter and the intake manifold. In some examples, the ELCM pump may be disabled at the end of Thr_D after measuring the MAP reading at Thr_D. Alternately, the ELCM pump may be disabled at a later time, such as at 556 of routine 500.

As the pump has evacuated the intake manifold and the volume downstream of the air filter, the pressure in the intake manifold may be negative (e.g., below atmospheric). Further, the pressure produced in the intake manifold may be based on a state of the air filter. For example, if the air filter is significantly clogged (e.g., fully restricted), the ELCM pump may be able to pull down a deeper vacuum in the intake manifold. In other words, a higher negative pressure may be produced in the intake manifold (and downstream of the air filter). If, however, the air filter is partially restricted, the ELCM pump may produce a lower level of vacuum.

Referring now to FIG. 6, it shows a map 600 illustrating a variation in MAP relative to a duration (shown as time) of operating the ELCM pump for air filters with different levels of degradation. Specifically, map 600 includes MAP plotted along the y-axis and time (or duration) of ELCM pump operation along the x-axis. As such, time increases from the left of the x-axis to the right of the x-axis. The ELCM pump is operated for the threshold duration, Thr_D, between time t0 and t1. As indicated at 530 in routine 500, MAP may be measured at the end of Thr_D as noted at time t1 in map 600.

Line 603 in map 600 represents atmospheric pressure (or barometric pressure) while line 605 represents a threshold, which may be predetermined, indicating complete degradation of the air filter. As such, line 605 may indicate a fully restricted air filter. The intake manifold pressure MAP for the fully restricted air filter, e.g., line 605, may be determined on bench (e.g., by placing a fully degraded air filter in the engine intake and running the air filter diagnostic) and stored in a memory of the controller.

Plot 616 in map 600 depicts an example variation in intake manifold pressure over the threshold duration of ELCM pump operation for a completely degraded air filter while plot 614 presents an example variation in MAP over Thr_D for a partially restricted air filter. Plot 612 indicates an example variation in MAP over Thr_D for a new air filter (e.g., fully unclogged or fresh air filter).

As shown in map 600, if the air filter is completely degraded (plot 616), a negative pressure may be produced in the intake manifold downstream of the air filter at a faster rate. Further, the intake manifold pressure may reduce to below line 605 within the threshold duration (at or before t1). In other words, a higher level of vacuum may be generated in the intake manifold within the threshold duration when the air filter is significantly restricted, e.g., 95% restricted. As shown in map 600, a difference between line 603 and line 605 may be represented by ΔT1. Thus, if an absolute difference is calculated between BP (e.g., line 603) and MAP at time t1 for plot 616, the absolute difference may be higher than or at least equal to ΔT1 for a completely degraded or fully restricted air filter.

As such, the variation in intake manifold pressure shown by plot 616 may be determined on bench for a vehicle by installing a fully restricted air filter and performing the air filter diagnostic. The profile of the variation of intake manifold pressure for the completely degraded air filter during the threshold duration of ELCM operation may be stored in a memory of the controller. Further, the threshold represented by line 605 may also be learned on bench for a fully restricted filter and stored in the memory of the controller for future air filter diagnosis.

Plot 614 depicts an example variation in intake manifold pressure for a partly restricted air filter. As shown, plot 614 may have a smaller slope relative to plot 616 and does not reduce to line 605 by the end of Thr_D. In other words, a rate of vacuum generation in the intake manifold during ELCM pump operation for the threshold duration may be lower with a partially degraded air filter. Furthermore, the MAP measured at the end of Thr_D in plot 614 may be higher than the MAP represented by line 605. Said another way, as the air filter is not significantly degraded, the negative pressure at time t1 for plot 614 may be lower (or shallower) than the negative pressure represented by line 605.

To elaborate, an absolute difference between BP and MAP for a partly restricted filter at the end of Thr_D may be lower than $\Delta T1$ but greater than $\Delta T2$. Herein, $\Delta T2$ represents an absolute difference between BP and MAP at end of Thr_D for a clean or fresh air filter. Specifically, plot 612 presents an example variation in intake manifold pressure over Thr_D for a new air filter. The variation in intake manifold pressure shown by plot 612 may be determined on bench for a vehicle by installing a fresh clean air filter and performing the air filter diagnostic. The profile of the variation of intake manifold pressure for the new air filter during the threshold duration of ELCM operation may be stored in a memory of the controller.

When the air filter is clean and unrestricted, operating the ELCM pump to evacuate the intake manifold downstream of the air filter may produce considerably lower levels of vacuum. In other words, at the end of Thr_D, MAP may be substantially close to atmospheric pressure. Said another way, the vacuum produced in the intake manifold at time t1 may be substantially lower (or shallow) than that produced for a fully restricted air filter (line 605). As shown in map 600, an absolute difference between BP and MAP for a new air filter at the end of the threshold duration of ELCM pump operation may be indicated as $\Delta T2$. Further, $\Delta T2$ may be significantly smaller than $\Delta T1$. Accordingly, an absolute difference between BP and MAP at time t1 for an air filter that is partially restricted (but not fully restricted) may be greater than $\Delta T2$ but smaller than $\Delta T1$.

It will be understood that a partly restricted air filter may be more obstructed than a fresh new air filter and, at the same time, less obstructed compared to a fully restricted air filter.

The air filter diagnostic of routine 500 in FIGS. 5A and 5B utilizes the absolute difference between BP and MAP at the end of Thr_D to assess the state of the air filter. Alternative examples of air filter diagnosis may utilize the profiles of plots 616 and 612 to compare the existing status of the air filter. For example, a rate of vacuum generation in the intake manifold during ELCM pump operation may be employed to determine the status of the air filter.

Returning to 532 of routine 500, an absolute difference between barometric pressure (BP) and the pressure in the intake manifold (MAP) is calculated. The pressure in the intake manifold, may be measured at the end of Thr_D. Further, pressure in the intake manifold at the end of Thr_D may be negative pressure. As explained above, a comparison of the barometric pressure and MAP may provide an indication of a status of the air filter. The barometric pressure may be measured by a barometric pressure sensor, such as BP sensor 246 of FIG. 2. Alternative embodiments may include estimating barometric pressure based on output from other sensors.

Next, at 534, routine 500 confirms if the absolute difference between barometric pressure and the pressure in the intake manifold (MAP) is higher than or equal to a first threshold difference, e.g., $\Delta T1$ of FIG. 6. As shown in map 600 of FIG. 6, the first threshold difference, $\Delta T1$, may be a difference between BP and MAP for a fully degraded air filter. If it is determined that the calculated absolute difference between BP and MAP is equivalent to $\Delta T1$ or higher than $\Delta T1$, routine 500 continues to 536 to indicate that the air filter is fully degraded. For example, a fully degraded air filter may be substantially clogged (e.g., at least 95% restricted). Next, at 538, routine 500 sets a DTC for the fully restricted air filter and may activate a MIL.

Further, at 540, routine 500 adjusts engine operating parameters based on the indication of the fully clogged air filter when the engine is activated subsequently. As a fully restricted filter can adversely affect, e.g., reduce, an amount of intake air received at the intake throttle, routine 500 may include adjusting a position of the intake throttle to allow a higher air flow into the intake manifold. For example, routine 500 may increase an opening of the intake throttle to enable the higher air flow. In another example, a fuel injection timing and/or amount may be adjusted based on the indication of the fully clogged air filter. Routine 500 then proceeds to 556 to restore the various valves and disable the ELCM pump. For example, the CPV may be closed (e.g., fully closed) and the intake throttle may be returned to a desired position during the engine-off condition. Further, the intake valves may be restored to desirable positions for a faster engine restart. If the ELCM pump was not disabled earlier, the ELCM pump may be deactivated at 556. Routine 500 then ends.

Returning to 534, if the absolute difference between BP and MAP is not higher than or equal to the first threshold difference, $\Delta T1$, routine 500 continues to 542. At 542, routine 500 confirms if the absolute difference between BP and MAP is lower than the first threshold difference, $\Delta T1$, and concurrently higher than a second threshold difference, $\Delta T2$ of FIG. 6. As described earlier, $\Delta T2$ may be the absolute difference between BP and MAP expected for a fresh, unrestricted air filter. In other words, the routine may confirm if the air filter is partly restricted at 542.

If it is determined that the absolute difference between BP and MAP is lower than the first threshold difference, $\Delta T1$, and higher than the second threshold difference, $\Delta T2$, routine 500 progresses to 548 to indicate the air filter is partly degraded. At 550, routine 500 includes predicting a remaining lifetime of the air filter (L_R) and storing the predicted L_R in the memory of the controller, such as in a vehicle health report. The remaining life of the air filter may be a duration (e.g. time or mileage) that the engine may be operated for with the existing air filter. In other words, the routine may predict when the existing air filter should be replaced.

At 552, the L_R of the air filter may be calculated based on a comparison of the negative pressure generated in the intake manifold at the end of Thr_D (as learned at 530) and the expected negative pressure for a fully restricted air filter ($\Delta T1$). Referring to FIG. 6, the remaining life of the air filter may be based on a comparison of the MAP at time t1 for plot 614 and the MAP for a fully restricted filter, line 605. This comparison is represented in map 600 as $\Delta RL$. Thus, in the example of plot 614 in map 600 of FIG. 6, the remaining life of the air filter may be based on $\Delta RL$. As one example, the remaining lifetime of the partly restricted air filter may be calculated as a ratio of $\Delta RL$ and $\Delta T1$.

Returning to routine 500, at 554 the remaining life of the air filter may also be estimated based on a rate of vacuum production during ELCM pump operation for the threshold duration, Thr_D. For example, a faster rate of vacuum generation in the intake manifold may indicate a shorter remaining life of the air filter. In another example, a slower rate of negative pressure production downstream of the air filter may indicate a longer remaining life of the air filter. Routine 500 then continues to 556 to restore all valves to their desired positions and disable the ELCM pump. Routine 500 then ends.

If it is determined at 542 that the absolute difference between BP and MAP is not between ΔT1 and ΔT2, routine 500 proceeds to 544. At 544, routine 500 determines that the absolute difference between BP and MAP is equal to ΔT2, and at 546 routine 500 indicates a robust, unrestricted air filter.

Thus, degradation of an air filter in an intake of an engine may be diagnosed based on a differential pressure produced across the air filter by operating an ELCM pump. The ELCM pump may be the same ELCM pump utilized to detect fuel system and EVAP system leaks. If the ELCM pump is a vacuum pump, negative pressure may be generated in the intake manifold by activating the ELCM pump after confirming that the evaporative emissions system or fuel system are leak free and based on a lack of lean engine DTCs. The ELCM pump may be fluidically coupled to the intake manifold, via a canister, by a purge line and specifically, by opening a canister purge valve in the purge line. Further, all intake valves of all cylinders may be closed to reduce a volume to be evacuated. Further still, an intake throttle may be shifted to a fully open position to enable fluidic communication between the ELCM pump and a region of the intake (e.g., intake passage) downstream of the air filter including the intake manifold. As such, pressure generated in the intake manifold by operating the ELCM pump may be measured after a threshold duration. This intake manifold pressure may then be compared to existing barometric pressure (e.g., observing differential pressure across the air filter) to assess a status of the air filter. If the absolute difference between the barometric pressure and intake manifold pressure is higher than or equal to a first threshold (or first threshold amount), the air filter may be fully degraded. In other words, if the difference between intake manifold pressure and barometric pressure is greater, the air filter is more degraded. If the absolute difference between the barometric pressure and intake manifold pressure is lower than the first threshold but higher than a second threshold, the air filter may be partly degraded. The second threshold may be smaller than the first threshold. Additionally, the second threshold may represent a differential pressure generated across a new air filter. Herein, if the difference between intake manifold pressure and barometric pressure is smaller, the air filter is less degraded.

It will be noted that though the above described diagnostic (of FIGS. 5A and 5B) employs a pump in the ELCM, which generates a negative pressure in the intake manifold during the air filter diagnostic, other embodiments may utilize a positive pressure pump to perform the air filter diagnosis. For example, a reversible pump of the ELCM may be employed to generate a pressure in the intake manifold to detect air filter condition.

The air filter diagnostic may also be utilized at an end-of-line station in an assembly line to detect a presence of an air filter. In other words, the air filter diagnostic can identify if the air filter is installed in a newly assembled vehicle. The newly assembled vehicle may include a vacuum pump coupled in the vehicle. For example, the vacuum pump may be included in an ELCM of the new vehicle. Herein, the diagnostic for confirming the presence of the air filter may be activated with or without performing leak tests for the evaporative emissions system and/or fuel system. The air filter diagnostic can also be performed after a service procedure in an auto service shop.

Figure 7:
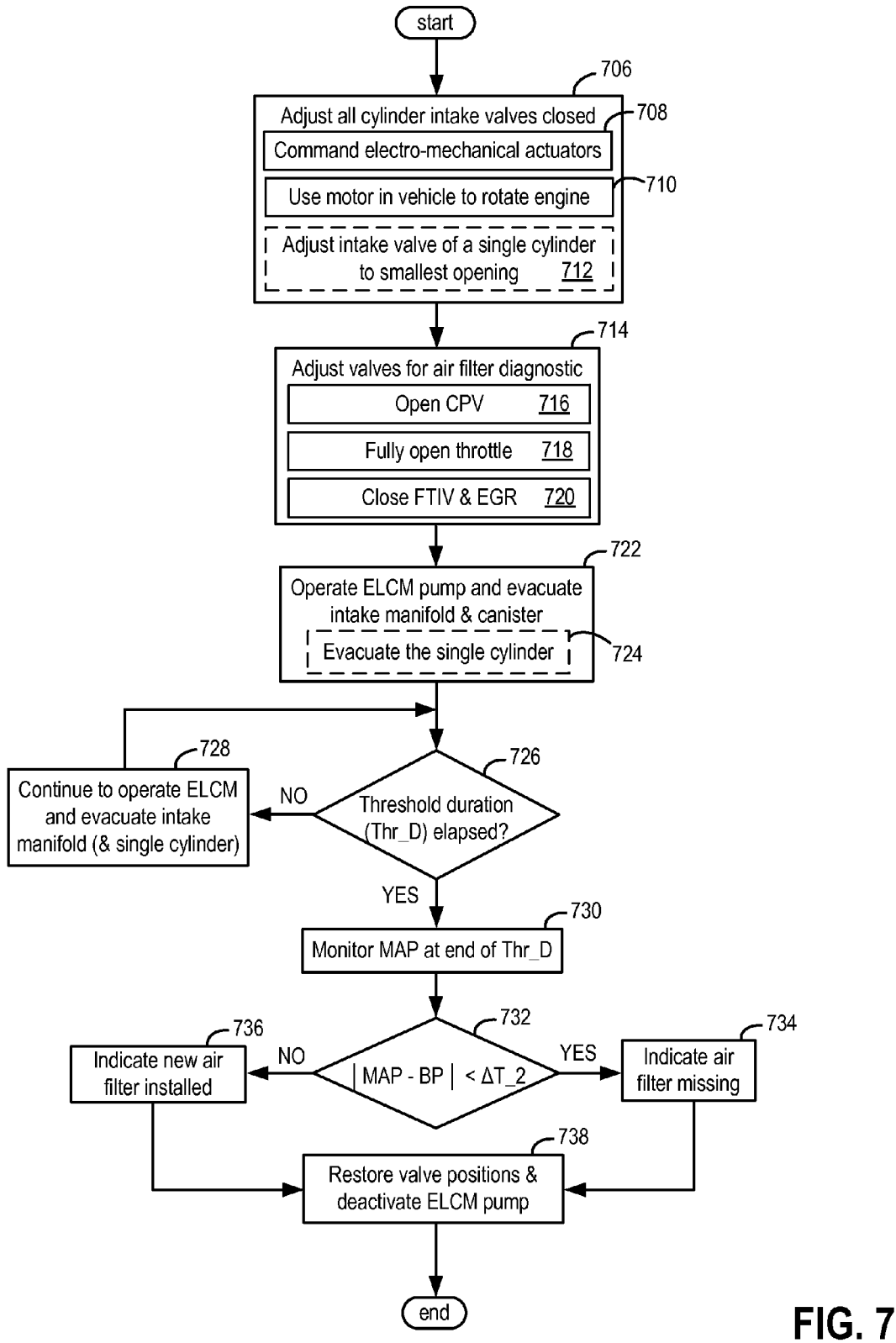
FIG. 7 presents a high level flow chart for testing the presence of an air filter at an end-of-line assembly plant.
Figure 8:
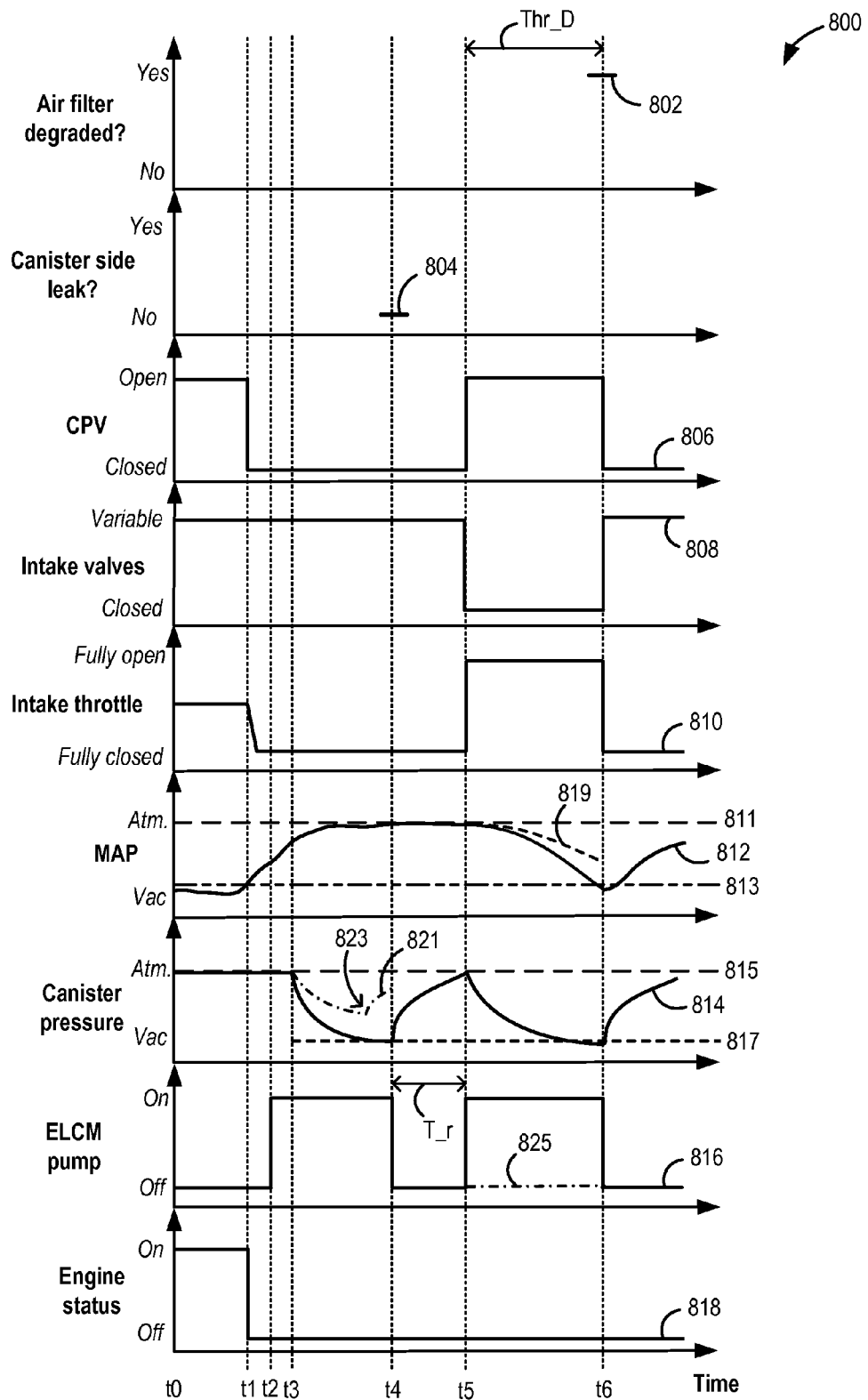
FIG. 8 depicts an example air filter diagnostic operation.

Routine 700 of FIG. 7 depicts an example air filter diagnostic for the end-of-line station in the assembly line at a vehicle assembly plant. The air filter diagnostic, like in routine 500, includes producing a pressure in an intake manifold of an engine by operating an ELCM pump and comparing the pressure in the intake manifold with barometric pressure to detect the presence of the new air filter. As such, a new clean air filter may provide a restriction, e.g. at least a small restriction, to air flow into the intake of the engine relative to when the air filter is absent. Routine 700 will be described in relation to the systems shown in FIGS. 1 and 2 but it should be understood that similar routines may be used with other systems without departing from the scope of this disclosure. Instructions for carrying out routine 700 included herein may be executed by a controller, such as controller 212 of FIG. 2, based on instructions stored on a memory of the controller and in conjunction with signals received from sensors of the engine system, such as the sensors described above with reference to FIG. 2. The controller may employ engine actuators of the engine system, such as the actuators of FIG. 2 to adjust engine operation and vehicle operation, according to the routines described below. It will be noted that routine 700 may be activated by an operator outside the vehicle.

At 706, routine 700 begins by adjusting all intake valves of all cylinders. Specifically, all the intake valves may be closed. As described earlier in reference to routine 500, at 708, electromechanical actuators coupled to the intake valves may be activated to adjust the intake valves to their respective fully closed positions. The electromechanical actuators may be included in an intake valve actuation system. If the vehicle is a hybrid vehicle, at 710, the motor and/or generator may be employed to rotate the engine to a position which causes the intake valves of all cylinders to be fully closed. Alternatively, at 712, the engine may be positioned such that one or more intake valves of a single cylinder of the engine have a reduced opening, e.g., a smallest opening. Herein, the intake valves of the remaining cylinders of the engine may be fully closed. As such, the cylinders of the engine may be sealed from the intake manifold at 706.

Next, at 714 routine 700 adjusts various valves for the air filter diagnostic. At 716, the canister purge valve (CPV) in a purge line of the vehicle is adjusted to fully open (from close). At 718, the intake throttle of the engine is fully opened (from partly closed), e.g., a maximum opening, to enable fluidic communication between the intake passage downstream of the air filter and the intake manifold. Further, at 720, the FTIV and EGR valve (if present) are adjusted to their fully closed positions (from open).

At 722, the ELCM pump may be activated. Specifically, the ELCM pump may receive power from a power source and may be enabled to evacuate each of the intake manifold, the canister, and intake passage between intake manifold and air filter. If the engine is positioned as described at 712, the single cylinder with a slightly open intake valve may also be evacuated. At 726, routine 700 determines if a threshold duration has elapsed. The threshold duration of routine 700 may be the same as threshold duration, Thr_D, of routine 500. In alternate examples, the threshold duration of routine 700 may be distinct from Thr_D of routine 500.

If the threshold duration has not elapsed, routine 700 continues to 728 to maintain ELCM pump operation such that the intake manifold, canister, etc. continue to be evacuated. Routine 700 then returns to 726. If the threshold duration of ELCM pump operation is elapsed, routine 700 progresses to 730 to measure the pressure in the intake manifold, MAP, at the end of the threshold duration. Next, at 732 an absolute difference between barometric pressure (BP) and MAP may be determined and compared to second threshold, ΔT2. Specifically, routine 700 determines if the absolute difference between BP and MAP is smaller than ΔT2. As mentioned earlier in reference to routine 500 of FIGS. 5A and 5B, and map 600 of FIG. 6, ΔT2 may be an expected absolute difference between BP and MAP for a clean, fresh air filter.

Referring again to map 600 of FIG. 6, plot 612 presents an example profile of a new fresh air filter. Further, plot 620 is a profile that may be expected when an air filter is missing in the engine intake. Thus, if the drop in MAP over the threshold duration is lower than (or smaller than) the expected drop for the new air filter (plot 612), the air filter may not be installed in the engine of the newly assembled vehicle.

If it is determined that the absolute difference between BP and MAP is lower than ΔT2, routine 700 proceeds to 734 to indicate that the air filter is missing. Herein, a new air filter may be installed in response to the indication after the routine ends. Further, routine 700 continues to 738 to restore all valves and disable the ELCM pump. Similar to 556 of routine 500, in one example, the CPV may be closed (from open), the intake throttle may be adjusted to mostly closed from fully open, and all intake valves of all cylinders may be adjusted to desired positions.

If the absolute difference between BP and MAP is not lower than ΔT2, routine 700 progresses to 736 to indicate that the newly assembled vehicle includes an air filter. Routine 700 then proceeds to 738 to return various valves to desired positions after the air filter diagnostic is completed. Furthermore, the ELCM pump is deactivated and shut down. Routine 700 then ends.

Turning now to FIG. 8, it depicts map 800 illustrating an example air filter diagnostic in a hybrid vehicle system. As such, map 800 will be described in relation to the systems shown in FIGS. 1 and 2. Map 800 depicts indication of degradation of the air filter at plot 802, indication of a leak in a canister (or evaporative emissions system) at plot 804, a status of a canister purge valve (CPV) at plot 806, a status of all intake valves of all engine cylinders at plot 808, a position of an intake throttle at plot 810, intake manifold pressure (MAP) at plot 812, canister pressure at plot 814, status of an ELCM pump at plot 816, and engine status at plot 818. Line 811 represents atmospheric pressure or barometric pressure, line 813 represents a predetermined threshold for a fully degraded air filter similar to line 605 of FIG. 6, line 815 represents atmospheric pressure or barometric pressure, and line 817 represents a vacuum threshold, e.g., for a 0.02" leak, based on an ELCM reference check. It will be noted that each of lines 811 and 815 represent the same pressure, e.g., atmospheric pressure. All plots are shown over time, along the x-axis. Further, time increases from the left of the x-axis towards the right. Note that elements aligning at a common time on the graph, such as at time t1, for example, are occurring concurrently, including for example where one parameter is increasing while another parameter is decreasing.

Between t0 and t1, the engine in the hybrid vehicle may be operating and propelling the hybrid vehicle via engine torque. As such, between t0 and t1, the motor may be deactivated. Since the engine is activated and combusting, all intake valves of the engine cylinders may be at variable positions based on cylinder strokes in a given engine cycle. Further, the ELCM pump may be deactivated, canister pressure may be substantially at atmospheric (e.g., within 5% of BP), and the intake throttle may be open midway between fully open and fully closed. As such, the engine may be operating at low to medium loads with a lower intake air flow. Further, MAP may be lower as engine operation produces a manifold vacuum. The CPV may be open to enable a purge operation during engine combustion. Specifically, a canister purge may be occurring prior to t1.

At t1, the engine may be shut down to rest and the motor may be activated (not shown) to propel the vehicle via motor torque. In response to engine deactivation, the intake throttle may be adjusted from halfway between fully open and fully closed to a mostly closed position. As such, an opening of the intake throttle may be reduced. The CPV may be adjusted to fully closed as the engine is no longer combusting. As such, the canister purge may be terminated. Further still, the MAP increases gradually towards atmospheric pressure after t1. Additionally, the positions of all intake valves may be set to different positions based on an engine position for a quick restart. As an example, a first portion of the intake valves may be fully closed, a second portion of the intake valves may be fully open, and a third portion of the intake valves may be between fully open and fully closed. Accordingly, these positions are indicated as variable though it should be noted that once the engine is deactivated and situated at a given position, the positions of the intake valves may not vary once selected.

An ELCM leak test of the evaporative emissions system, particularly a canister side leak test, may be activated at t2. For example, the leak test may be activated responsive to a threshold duration or mileage since a previous leak test. The ELCM pump may be energized to draw a vacuum on the canister. The FTIV, if present, may be closed to isolate the fuel tank from the canister side. The CPV may be maintained closed at t2. Further, the positions of the intake throttle and the intake valves may be maintained as at t1. A canister vent valve may be closed to isolate the ELCM from each of the EVAP system (including canister) and the fuel system. As the ELCM pump is operated, the ELCM draws a vacuum through its internal reference orifice, allowing a vacuum reference (line 817) to be established for a leak with an equivalent diameter to the reference orifice (0.02" in one example). As such, the canister pressure remains constant at atmospheric, even with the ELCM pump on, as shown by plot 814 between t2 and t3.

At t3, the vacuum reference is set, as represented by line 817, and the canister side leak test may then begin. The ELCM pump remains on, as shown by plot 816, and draws a vacuum on the canister side of the fuel system, but not the fuel tank. From t3 to t4, the canister side pressure drops, as shown by plot 814, until the pressure reaches the vacuum reference shown by line 817 just before t4. With the canister side pressure reaching the vacuum reference at time t4, the integrity of the canister side is confirmed, and the ELCM leak test may progress to testing the fuel tank, if desired. As such, the fuel tank leak test is not depicted herein for enabling clarity of the air filter diagnostic. Thus, at t4, absence of a canister side leak is indicated (plot 804) and the ELCM pump is deactivated at t4 as the leak test is ended. Further, the FTIV and canister vent valve, if present, may be opened. Accordingly, canister pressure may rise gradually to atmospheric between t4 and t5. Between t4 and t5, the ELCM pump is deactivated for a duration T_r. At t5, an air filter diagnostic may be triggered. For example, the air filter diagnostic may be initiated if a threshold duration since a previous air filter diagnostic is surpassed. The air filter diagnostic may also be initiated at t5 as the canister side leak test between t2 and t4 indicated that the canister side was leak free. Further, the duration since indicating that the canister side is leak free may be short and the leak test of the canister between t2 and t4 may be considered a recent leak test. As such, the duration T_r since the canister side leak test may be short enough to initiate the air filter diagnostic.

Thus, at t5, all the intake valves of all engine cylinders are fully closed. Herein, the motor and/or generator of the hybrid vehicle may position the engine such that all intake valve are fully closed. Alternately, the intake valve actuation system may adjust all intake valves to fully closed. The CPV is adjusted to fully open at t5 while the intake throttle is simultaneously moved to the fully open position. At t5, the same or common ELCM pump is activated again and there is a decrease in canister pressure as the ELCM is fluidically coupled to the intake manifold via the canister. Concurrently, intake manifold pressure (MAP) also reduces from atmospheric (plot 812) between t5 and t6. As such, the duration between t5 and t6 may be the threshold duration, Thr_D, of routine 500. As the ELCM pump is operated between t5 and t6, MAP reduces to below the threshold for the fully degraded filter (line 813) and at t6, air filter degradation is indicated by plot 802.

If the air filter is partly restricted, the MAP profile may be shown by plot 819 (small dashes) between t5 and t6. Herein, the controller may additionally calculate a remaining lifetime of the air filter and store the data in a vehicle health report.

As such, the air filter diagnostic is terminated at t6 by deactivating the ELCM pump after indicating the status of the air filter. Further, as the engine remains shut down, the intake throttle may be shifted back to a mostly closed position while the CPV is fully closed and the intake valves are returned to their positions before the air filter diagnostic (e.g., that before t5). Thus, each of MAP and canister pressure gradually rises towards atmospheric pressure after t6.

It will be noted that if the canister is saturated with hydrocarbons prior to the leak test at t2t, operation of the ELCM pump between t3 and t4 during the leak test may cause variation in canister pressure as shown by plot 821 (dash-dot plot between t3 and t4). Initially the ELCM pump may produce a negative pressure in the canister. However, as vacuum application on the canister is continued, hydrocarbon breakthrough may occur which may be indicated as an inflection 823 in canister pressure (or pressure at the ELCM). After inflection 823, the vacuum begins to decay (or decrease) to atmospheric pressure. In response to detecting canister saturation and hydrocarbon breakthrough, the ELCM pump may be deactivated and the canister leak test (or fuel system leak test) may be aborted. Further, the subsequent air filter diagnostic between t5 and t6 may not be performed as the canister may not be purged during the engine-off condition. Thus, the ELCM pump may not be enabled between t5 and t6 and instead may remain deactivated as shown by plot 825 (dash-dot line). Further, canister pressure may remain at atmospheric between t5 and t6 as the ELCM pump is deactivated and the air filter diagnostic is not performed.

Thus, an example method for an engine in a hybrid vehicle may comprise during an engine-off condition, indicating degradation of an air filter based on a comparison of atmospheric pressure and a pressure in an intake manifold of the engine, the pressure in the intake manifold being a negative pressure produced via a pump coupled to an evaporative emissions system of the engine. In the preceding example, the engine-off condition may additionally or optionally include one of a vehicle key-off event and vehicle propulsion via motor torque. In any or all of the preceding examples, producing negative pressure via the pump may additionally or optionally include each of opening an intake throttle, opening a canister purge valve, closing all cylinder intake valves, and operating the pump for a threshold duration. In any or all of the preceding examples, producing the negative pressure via the pump also includes evacuating a canister. In any or all of the preceding examples, the comparison of atmospheric pressure and the pressure in the intake manifold may additionally or optionally include calculating an absolute difference between atmospheric pressure and the pressure in the intake manifold. In any or all of the preceding examples, degradation of the air filter may be additionally or optionally indicated when the absolute difference between atmospheric pressure and the pressure in the intake manifold is higher than a first threshold difference. In any or all of the preceding examples, the method may additionally or optionally comprise indicating partial degradation of the air filter when the absolute difference between atmospheric pressure and the pressure in the intake manifold is lower than the first threshold difference and higher than a second threshold difference. In any or all of the preceding examples, the method may additionally or optionally comprise estimating a remaining lifetime of the air filter in response to indicating partial degradation of the air filter, wherein the remaining lifetime may be additionally or optionally estimated based on a rate of production of negative pressure in the intake manifold by the pump. In any or all of the preceding examples, the method may additionally or optionally comprise indicating an absence of the air filter when the absolute difference between atmospheric pressure and the pressure in the intake manifold is lower than the second threshold difference.

In another example, a method for an engine may comprise during an engine-off mode, opening each of an intake throttle and a purge valve while closing intake valves of all engine cylinders, operating a vacuum pump coupled to an evaporative emissions system to evacuate an intake manifold, and indicating a state of an air filter in an intake of the engine based on an absolute difference between intake manifold pressure and barometric pressure. In the preceding example, the state of the air filter may additionally or optionally be indicated as fully restricted responsive to the absolute difference between intake manifold pressure and barometric pressure being higher than a first threshold. In any or all of the preceding examples, the state of the air filter may be additionally or optionally indicated as partly restricted responsive to the absolute difference between intake manifold pressure and barometric pressure being higher than a second threshold and lower than the first threshold. In any or all of the preceding examples, the engine-off condition may additionally or optionally include the engine being shut down to rest, and wherein the vacuum pump may additionally or optionally receive power from a vehicle battery. In any or all of the preceding examples, the method may additionally or optionally comprise responsive to detecting leaks in an evaporative emissions system coupled to the engine, not opening each of the intake throttle and the purge valve, not closing intake valves of all cylinders, not operating the vacuum pump to evacuate the intake manifold, and not indicating the state of the air filter. Herein, the air filter diagnostic may not be initiated if the evaporative emissions system (and/or fuel system) is diagnosed as degraded.

In yet another example, a system for a hybrid vehicle may comprise an engine including an intake manifold, an air filter coupled to an intake passage, the air filter positioned upstream of the intake manifold, an evaporative emissions system including a canister, the canister coupled to the intake manifold via a purge valve positioned in a purge line, a pump coupled to the canister, and a controller with computer-readable instructions stored in non-transitory memory for during a first engine-off condition, operating the pump to perform a leak test of the evaporative emissions system, and indicating degradation of the evaporative emissions system based on the leak test, and during a second engine-off condition, operating the pump to produce a pressure in the intake manifold, and indicating degradation of the air filter based on a difference between atmospheric pressure and the pressure in the intake manifold. In any or all of the preceding examples, during the first engine-off condition, the leak test may additionally or optionally include operating the pump to apply a pressure to an evaporative emissions system, and wherein degradation of the evaporative emissions system may be additionally or optionally indicated responsive to the pressure in the evaporative emissions system not reaching a reference threshold. In any or all of the preceding examples, during the second engine-off condition, the pump may be additionally or optionally operated for a threshold duration, and wherein producing the pressure in the intake manifold may additionally or optionally include applying pressure from the pump via each of the canister, the purge line, and the purge valve. In any or all of the preceding examples, the controller may additionally or optionally include further instructions for indicating degradation of the air filter responsive to an absolute difference between atmospheric pressure and pressure in the intake manifold being higher than a threshold amount. In any or all of the preceding examples, the controller may additionally or optionally include further instructions for adjusting one or more of fuel injection amount, fuel injection timing, and throttle position responsive to indicating degradation of the air filter. In any or all of the preceding examples, the controller may additionally or optionally include further instructions for during the second engine-off condition, in response to detecting lean conditions in the engine, not operating the pump and not indicating degradation of the air filter.

In an example representation, a method may comprise during an engine-off condition, diagnosing an air filter for degradation by generating a vacuum in an intake manifold of an engine and comparing the vacuum generated in the intake manifold to a threshold (such as, line 605 of FIG. 6), the vacuum generated via operating a pump coupled to an evaporative emissions system of the engine. In the preceding example, the method may additionally or optionally comprise disabling the diagnosing of the air filter in response to detecting saturation of (or hydrocarbon (HC) breakthrough from) a fuel vapor canister. Saturation of the fuel vapor canister (or HC breakthrough) may be confirmed by applying a vacuum to the fuel vapor canister and indicating canister saturation responsive to an inflection in canister pressure indicative of a decay in fuel vapor canister side vacuum.

In this way, air filter status may be monitored for restriction. The air filter diagnostic introduced in the present disclosure may be performed without engine operation. A technical effect of using an existing ELCM pump for air filter diagnosis is that the air filter diagnostic may not rely on engine vacuum and may be performed at regular intervals. Further, by using the same ELCM pump for leak tests of the fuel or EVAP system and air filter diagnosis, packaging issues may be reduced. By monitoring the air filter status, fuel economy of the vehicle may be maintained and concerns of spark plug fouling due to rich conditions may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine in a hybrid vehicle, comprising:
during an engine-off condition,
indicating degradation of an air filter based on a comparison of atmospheric pressure and a pressure in an intake manifold of the engine, the pressure in the intake manifold being a negative pressure produced via a pump coupled to an evaporative emissions system of the engine.

2. The method of claim 1, wherein the engine-off condition includes one of a vehicle key-off event and vehicle propulsion via motor torque.

3. The method of claim 1, wherein producing negative pressure via the pump includes each of opening an intake throttle, opening a canister purge valve, closing all cylinder intake valves, and operating the pump for a threshold duration.

4. The method of claim 1, wherein producing the negative pressure via the pump also includes evacuating a canister.

5. The method of claim 1, wherein the comparison of atmospheric pressure and the pressure in the intake manifold includes calculating an absolute difference between atmospheric pressure and the pressure in the intake manifold.

6. The method of claim 5, wherein degradation of the air filter is indicated when the absolute difference between atmospheric pressure and the pressure in the intake manifold is higher than a first threshold difference.

7. The method of claim 6, further comprising indicating partial degradation of the air filter when the absolute difference between atmospheric pressure and the pressure in the intake manifold is lower than the first threshold difference and higher than a second threshold difference.

8. The method of claim 7, further comprising estimating a remaining lifetime of the air filter in response to indicating partial degradation of the air filter, wherein the remaining lifetime is estimated based on a rate of production of negative pressure in the intake manifold by the pump.

9. The method of claim 7, further comprising indicating an absence of the air filter when the absolute difference between atmospheric pressure and the pressure in the intake manifold is lower than the second threshold difference.

10. A method for an engine, comprising:
during an engine-off mode,
opening each of an intake throttle and a purge valve while closing intake valves of all engine cylinders;
operating a vacuum pump coupled to an evaporative emissions system to evacuate an intake manifold; and
indicating a state of an air filter in an intake of the engine based on an absolute difference between intake manifold pressure and barometric pressure.

11. The method of claim 10, wherein the state of the air filter is indicated as fully restricted responsive to the absolute difference between intake manifold pressure and barometric pressure being higher than a first threshold.

12. The method of claim 11, wherein the state of the air filter is indicated as partly restricted responsive to the absolute difference between intake manifold pressure and barometric pressure being higher than a second threshold and lower than the first threshold.

13. The method of claim 10, wherein the engine-off condition includes the engine being shut down to rest, and wherein the vacuum pump receives power from a vehicle battery.

14. The method of claim 10, further comprising:
responsive to detecting leaks in an evaporative emissions system coupled to the engine,
not opening each of the intake throttle and the purge valve;
not closing intake valves of all cylinders;
not operating the vacuum pump to evacuate the intake manifold; and
not indicating the state of the air filter.

15. A system for a hybrid vehicle, comprising:
an engine including an intake manifold;
an air filter coupled to an intake passage, the air filter positioned upstream of the intake manifold;
an evaporative emissions system including a canister, the canister coupled to the intake manifold via a purge valve positioned in a purge line;
a pump coupled to the canister; and
a controller with computer-readable instructions stored in non-transitory memory for:
during a first engine-off condition,
operating the pump to perform a leak test of the evaporative emissions system; and
indicating degradation of the evaporative emissions system based on the leak test; and
during a second engine-off condition,
operating the pump to produce a pressure in the intake manifold; and
indicating degradation of the air filter based on a difference between atmospheric pressure and the pressure in the intake manifold.

16. The system of claim 15, wherein during the first engine-off condition, the leak test includes operating the pump to apply a pressure to an evaporative emissions system, and wherein degradation of the evaporative emissions system is indicated responsive to the pressure in the evaporative emissions system not reaching a reference threshold.

17. The system of claim 15, wherein during the second engine-off condition, the pump is operated for a threshold duration, and wherein producing the pressure in the intake manifold includes applying pressure from the pump via each of the canister, the purge line, and the purge valve.

18. The system of claim 15, wherein the controller includes further instructions for indicating degradation of the air filter responsive to an absolute difference between atmospheric pressure and pressure in the intake manifold being higher than a threshold amount.

19. The system of claim 18, wherein the controller includes further instructions for adjusting one or more of fuel injection amount, fuel injection timing, and throttle position responsive to indicating degradation of the air filter.

20. The system of claim 15, wherein the controller includes further instructions for during the second engine-off condition, in response to detecting lean conditions in the engine, not operating the pump and not indicating degradation of the air filter.

* * * * *